United States Patent
Yocam et al.

(10) Patent No.: US 10,432,461 B2
(45) Date of Patent: Oct. 1, 2019

(54) PEER-TO-PEER DISTRIBUTION OF RADIO PROTOCOL DATA FOR SOFTWARE DEFINED RADIO (SDR) UPDATES

(71) Applicant: T-Mobile USA, Inc., Bellevue, WA (US)

(72) Inventors: Eric W. Yocam, Sammamish, WA (US); Darren J. Kress, Bothell, WA (US); Ahmad Arash Obaidi, San Ramon, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/828,201

(22) Filed: Nov. 30, 2017

(65) Prior Publication Data

US 2018/0097690 A1    Apr. 5, 2018

Related U.S. Application Data

(63) Continuation-in-part of application No. 15/135,081, filed on Apr. 21, 2016, now Pat. No. 10,091,830.

(Continued)

(51) Int. Cl.
*H04M 3/00*   (2006.01)
*H04L 12/24*  (2006.01)
(Continued)

(52) U.S. Cl.
CPC ......... *H04L 41/082* (2013.01); *H04B 1/0003* (2013.01); *H04L 67/104* (2013.01);
(Continued)

(58) Field of Classification Search
CPC ........ G06F 8/65; G06F 8/60; G06F 17/30206; G06F 11/1433; G06F 17/30194;
(Continued)

(56) References Cited

U.S. PATENT DOCUMENTS 7,319,715 B1   1/2008   Souissi et al.
8,112,066 B2   2/2012   Ben Ayed
(Continued)

FOREIGN PATENT DOCUMENTS

KR   1020130125385      11/2013
WO   WO2015/172803 A1   11/2015

OTHER PUBLICATIONS

Audet, F., "The Use of the SIPS URI Scheme in the Session Initiation Protocol (SIP)", Network Working Group, Request for Comments 5630, Standards Track, Oct. 2009, pp. 1-21 and 51.

(Continued)

*Primary Examiner* — Quoc Thai N Vu
(74) *Attorney, Agent, or Firm* — Lee & Hayes, P.C.

(57) ABSTRACT

Updated radio protocol data may be propagated in a peer-to-peer (P2P) distribution scheme so that peer devices that are incompatible with a particular radio protocol may be dynamically re-configured to communicate with other devices using the particular radio protocol. A remote server(s) may push updated radio protocol data to a hub device, which thereafter disseminates the radio protocol data to other peer devices. These peer devices can forward the data to downstream peer devices, and so on, without further intervention by the remote server(s) that initiated the distribution. The transfer of radio protocol data over P2P connections may occur using a broadcasting technique where, prior to the transfer, a device in possession of the radio protocol data broadcasts an indication to nearby peer devices, which can receive the broadcast and indicate to the broadcaster whether they are ready to receive the radio protocol data.

20 Claims, 13 Drawing Sheets

Related U.S. Application Data

(60) Provisional application No. 62/263,379, filed on Dec. 4, 2015.

(51) Int. Cl.

| | | |
|---|---|---|
| *H04L 29/08* | (2006.01) | |
| *H04B 1/00* | (2006.01) | |
| *H04W 12/02* | (2009.01) | |
| *H04W 12/04* | (2009.01) | |
| *H04W 24/02* | (2009.01) | |
| *H04W 76/14* | (2018.01) | |
| *H04W 4/70* | (2018.01) | |
| *H04W 4/80* | (2018.01) | |

(52) U.S. Cl.
CPC ...... *H04L 67/1076* (2013.01); *H04L 67/1097* (2013.01); *H04L 67/34* (2013.01); *H04W 4/70* (2018.02); *H04W 12/02* (2013.01); *H04W 12/04* (2013.01); *H04W 24/02* (2013.01); *H04W 76/14* (2018.02); *H04W 4/80* (2018.02)

(58) Field of Classification Search
CPC ....... G06F 3/123; G06F 8/658; H04B 1/0003; H04L 67/34; H04L 67/1044; H04L 67/306; H04L 67/1076; H04L 67/1097; H04L 67/104; H04L 41/082; H04W 88/04; H04W 12/02; H04W 12/04; H04W 24/02; H04W 4/70; H04W 4/80; H04W 76/14

See application file for complete search history.

(56) References Cited

U.S. PATENT DOCUMENTS

| | | |
|---|---|---|
| 8,443,071 B2 | 5/2013 | Lu et al. |
| 8,566,947 B1 | 10/2013 | Sankruthi |
| 8,971,803 B2 | 3/2015 | Dua |
| 9,100,426 B1 | 8/2015 | Fang |
| 9,125,027 B2 | 9/2015 | Koenig et al. |
| 9,160,420 B2 | 10/2015 | Dua |
| 9,606,817 B1 | 3/2017 | Efstathopoulos |
| 9,674,763 B2 | 6/2017 | Mufti |
| 2002/0057786 A1 | 5/2002 | Donovan et al. |
| 2002/0163895 A1 | 11/2002 | Haller et al. |
| 2003/0035397 A1 | 2/2003 | Haller et al. |
| 2004/0186897 A1 | 9/2004 | Knauerhase et al. |
| 2004/0249915 A1 | 12/2004 | Russell |
| 2005/0213516 A1 | 9/2005 | Ramirez, II et al. |
| 2005/0213590 A1 | 9/2005 | Hauenstein et al. |
| 2007/0143390 A1* | 6/2007 | Giambalvo ............... G06F 8/61 709/200 |
| 2007/0293197 A1 | 12/2007 | Ekberg et al. |
| 2008/0155249 A1* | 6/2008 | Backof ............... H04B 1/0003 713/100 |
| 2008/0220757 A1 | 9/2008 | Zeller et al. |
| 2009/0006503 A1 | 1/2009 | Bernardi et al. |
| 2009/0216349 A1 | 8/2009 | Kwon et al. |
| 2009/0319613 A1 | 12/2009 | Hjelm et al. |
| 2010/0131628 A1 | 5/2010 | Yu et al. |
| 2010/0323714 A1 | 12/2010 | Schmidt et al. |
| 2011/0047282 A1 | 2/2011 | Denman et al. |
| 2011/0202418 A1 | 8/2011 | Kempton et al. |
| 2011/0320520 A1 | 12/2011 | Jain |
| 2012/0198084 A1 | 8/2012 | Keskitalo et al. |
| 2012/0214460 A1 | 8/2012 | Russell |
| 2014/0085502 A1 | 3/2014 | Lin et al. |
| 2014/0150064 A1 | 5/2014 | Wifvesson et al. |
| 2014/0227976 A1* | 8/2014 | Callaghan ............... G06F 8/65 455/41.2 |
| 2014/0248848 A1 | 9/2014 | Mufti et al. |
| 2014/0269425 A1 | 9/2014 | Fisher et al. |
| 2014/0269496 A1 | 9/2014 | Mufti |
| 2014/0328241 A1 | 11/2014 | Subramanian et al. |
| 2014/0355446 A1 | 12/2014 | Altman |
| 2014/0370895 A1 | 12/2014 | Pandey et al. |
| 2015/0087325 A1 | 3/2015 | Nuss et al. |
| 2015/0135283 A1 | 5/2015 | Tofighbakhsh |
| 2015/0138952 A1 | 5/2015 | Tamura et al. |
| 2015/0178064 A1* | 6/2015 | Cairns ............... G06F 8/65 717/171 |
| 2015/0180730 A1 | 6/2015 | Felstaine et al. |
| 2015/0195236 A1 | 7/2015 | Nie et al. |
| 2015/0208320 A1 | 7/2015 | Alexander et al. |
| 2015/0223252 A1 | 8/2015 | Yan |
| 2015/0281939 A1 | 10/2015 | Li et al. |
| 2015/0282077 A1 | 10/2015 | Yavuz et al. |
| 2015/0326448 A1 | 11/2015 | Chaudhary et al. |
| 2015/0333979 A1 | 11/2015 | Schwengler et al. |
| 2015/0350947 A1 | 12/2015 | Khayrallah |
| 2015/0365217 A1 | 12/2015 | Scholten et al. |
| 2016/0021238 A1 | 1/2016 | Abramson et al. |
| 2016/0037569 A1 | 2/2016 | Kim et al. |
| 2016/0088064 A1* | 3/2016 | Chen ............... H04M 1/7253 709/204 |
| 2016/0323161 A1 | 11/2016 | Cuervo Laffaye et al. |
| 2016/0330140 A1 | 11/2016 | Cook et al. |
| 2016/0378454 A1* | 12/2016 | Nekrestyanov ............ G06F 8/65 717/170 |
| 2017/0052806 A1 | 2/2017 | Akiyoshi |
| 2017/0063598 A1 | 3/2017 | Zhu et al. |
| 2017/0099347 A1* | 4/2017 | Pucha ............... H04W 4/80 |
| 2017/0164417 A1 | 6/2017 | Kress et al. |
| 2017/0257229 A1 | 9/2017 | Fisher et al. |
| 2017/0318479 A1 | 11/2017 | Cotanis et al. |
| 2017/0353556 A1 | 12/2017 | Seenappa et al. |
| 2018/0097775 A1 | 4/2018 | Obaidi |
| 2018/0098230 A1 | 4/2018 | Obaidi |
| 2018/0176775 A1 | 6/2018 | Obaidi |

OTHER PUBLICATIONS

Bappalige, S.P., "An Introduction to Apache Hadoop", Opensource.com, retrieved on Dec. 20, 2016 from <<https://opensource.com/life/14/8/intro-apache-hadoop-big-data>>, 16 pages.

"Fault Tolerant Computer System", Wikipedia, retrieved Jan. 25, 2017 from <<https://en.wikipedia.org/wiki/Fault-tolerant_computer_system>>, 5 pages.

Hamlin, K., "A Study on SETI@home Distributed Network", Department of Computer Science, Wichita State University, retrieved Dec. 20, 2016 from <<http://www.cs.wichita.edu/~chang/lecture/cs843/project/paper/kh-stei.pdf>>, 11 pages.

"Hot Spare", Wikipedia, retrieved Jan. 25, 2017 from <<https://en.wikipedia.org/wiki/Hot_spare>>, 3 pages.

Jennings, et al., "Managing Client-Initiated Connections in the Session Initiation Protocol (SIP)", Network Working Group, Request for Comments 5626, Standards Track, Oct. 20019, pp. 1-4, 6-18, 21-25, and 44-45.

Kallenberg, C., "Setup for Failure: Defeating Secure Boot", The MITRE Corporation, Mar. 6, 2014, retrieved from <<https://infocon.org/cons/SyScan/SyScan%202014%20Singapore/SyScan%202014%20presentations/SyScan2014_CoreyKallenberg_SetupforFailureDefeatingSecureBoot_WP.pdf>>, 4 pages.

"MyTAM—Intercede", retrieved Jan. 25, 2017 from <<https://www.intercede.com/products-mytam>>, 9 pages.

Office action for U.S. Appl. No. 15/135,081, dated Jun. 14, 2017, Kress, "Hub Device", 18 pages.

The PCT Search Report and Written Opinion dated Feb. 2, 2017 for PCT application No. PCT/US2016/063371, 11 pages.

Proudler, G., "What's in a Trusted Computing Platform?", InformIt, Aug. 23, 2002, retrieved from <<http://www.informit.com/articles/printerfriendly/28804>>, 6 pages.

Regenscheid, A., "Roots of Trust in Mobile Devices", ISPAB, Feb. 2012, retrieved from <<http://csrc.nist.gov/groups/SMA/ispab/documents/minutes/2012-02/feb1_mobility-roots-of-trust_regenscheid_pdf>>, 5 pages.

"Security Enhancements in Android 4.3", Android Open Source Project, retrieved Jan. 25, 2017, from <<https://source.android.com/security/enhancements/enhancements43.html>>, 1 page.

(56) References Cited

OTHER PUBLICATIONS

"Trust Zone—Arm Developer", retrieved Jan. 25, 2017 from <<https://developer.arm.com/technologies/trustzone>>, 7 pages.

"Trusted Execution Environment", Wikipedia, retrieved Jan. 25, 2017 from <<https://en.wikipedia.org/wiki/Trusted_execution_environment>>. 5 pages.

"Trusted Execution Technology", Wikipedia, retrieved Jan. 25, 2017 from <<https://en.wikipedia.org/wiki/Trusted_Execution_Technology>>, 5 pages.

"Trusted Platform Module", Wikipedia, retrieved Jan. 25, 2017 from <<https://en.wikipedia.org/wiki/Trusted_Platform_Module>>, 10 pages.

Office Action for U.S. Appl. No. 15/282,297, dated Apr. 6, 2018, Obaidi, "Dynamic Provisioning of a Firewall Role to User Devices", 7 pgs.

Office Action for U.S. Appl. No. 15/282,385, dated May 1, 2018, Obaidi, "Dynamic Provisioning of a Gateway Role to User Devices", 22 pgs.

"Cisco NFV Solution: Enabling Rapid Service Innovation in the Era of Virtualization", White Paper, SISCO Oct. 2014, Retrieved from https://www.cisco.com/c/dam/globalshared/assets/pdf/sp04/nfv-solution.pdf, 9 pgs.

The PCT Search Report and Written Opinion dated Jan. 11, 2018 for PCT application No. PCT/US17/54199, 14 pages.

The PCT Search Report and Written Opinion dated Jan. 20, 2018 for PCT application No. PCT/US17/54200, 12 pages.

Office Action for U.S. Appl. No. 15/135,081, dated Jan. 16, 2018, Kress, "Hub Device", 18 pages.

Office Action for U.S. Appl. No. 15/386,563, dated Nov. 16, 2018, Obaidi, "Network Operation and Trusted Execution Environment", 24 pages.

Office Action for U.S. Appl. No. 15/282,385, dated Oct. 1, 2018, Obaidi, "Dynamic Provisioning of a Gateway Role to User Devices", 29 pgs.

Extended European Search Report dated May 9, 2019, for European Patent Application No. 16871293.3, 11 pages.

* cited by examiner

US 10,432,461 B2

PEER-TO-PEER DISTRIBUTION OF RADIO PROTOCOL DATA FOR SOFTWARE DEFINED RADIO (SDR) UPDATES

CROSS-REFERENCE TO RELATED APPLICATIONS

This application is a continuation-in-part of, and claims the benefit of, commonly assigned, co-pending U.S. patent application Ser. No. 15/135,081, filed Apr. 21, 2016, which claims the benefit of U.S. Provisional Patent Application No. 62/263,379, filed Dec. 4, 2015. Application Ser. No. 15/135,081 and Application Ser. No. 62/263,379 are fully incorporated herein by reference.

BACKGROUND

Telecommunications network architectures are continuously updated as increasingly powerful physical layer technologies (PLTs) are implemented to increase data transmission rates and ranges. Modern routing devices are typically configured with dedicated PLT hardware that is incapable of being reconfigured, e.g. to operate with different PLTs. Accordingly, modern routing devices that are deployed for use with already implemented PLTs may become outdated and requiring of replacement equipment upon implementation of new PLTs. Moreover, as the realm of the Internet of Things (IoT) expands, internet connectivity is becoming ubiquitous for an increasing array of physical objects embedded with software and sensors configured to collect field data from physical world and provide that field data to user's and/or third party service providers via the internet. The technologies and protocols which enable IoT communication are also expanding and, naturally, modern routing devices are currently incompatible with yet to be implemented and/or developed IoT protocols.

Accordingly, it may be tedious or impracticable to remain up to date in terms of connectivity abilities using modern routing devices which are statically configured to operate with predetermined telecommunications PLTs and IoT protocols.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
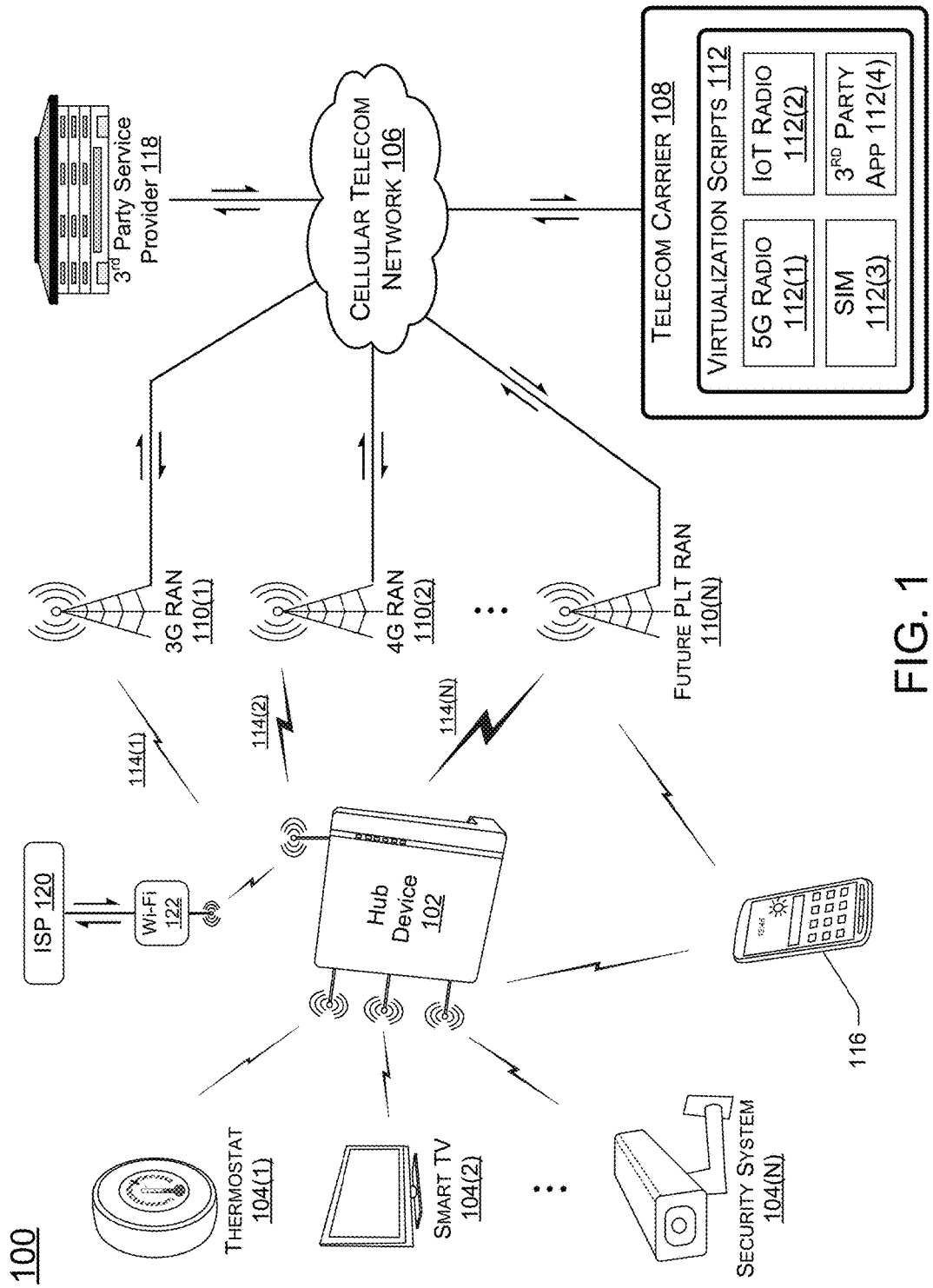
FIG. 1 illustrates an overview of an exemplary system for maintaining an updated communication-bridge between an Internet-of-Things (IoT) physical object network and a cellular telecommunications (telecom) network, in accordance with various implementations of the disclosure.

This disclosure describes various systems and processes that may be implemented to maintain an updated communication-bridge between an Internet-of-Things (IoT) physical object network and a cellular telecommunications network. In particular, the systems and processes may implement a hub device for bridging communications between an IoT physical object network and a telecommunications network, wherein the hub device is capable of being dynamically reconfigured to communicate over newly implemented technologies and/or protocols. For example, as part of implementing a new physical layer technology (PLT) of a telecommunications network, a telecommunications carrier may push updated PLT protocol data to the hub device to enable the hub device to communicate via the new PLT. Once the updated PLT protocol data is received, the hub device may be updated with new functionality which enables it to establish a connection with the new PLT despite having been incompatible with the new PLT prior to having received the updated PLT protocol data. The hub device may further receive updated IoT protocol data which enables it, upon being reconfigured, to establish connections utilizing new IoT communications protocols. These systems and processes, which are described further herein, can alleviate the need to continuously replace physical router devices, or hardware components thereof, in response to newly implemented PLT and/or IoT communication protocols.

Also described herein are, among other things, techniques and systems for propagating, in a peer-to-peer (P2P) distribution scheme, updated radio protocol data to peer devices that are currently incompatible with a particular radio protocol (e.g., a PLT communication protocol, IoT communication protocol, etc.). Peer devices that receive and implement the updated radio protocol data can be dynamically re-configured to communicate with other devices using a radio protocol with which the peer device was previously incompatible. The P2P distribution scheme may begin with a remote server(s) pushing updated radio protocol data to a hub device. Because the server(s) is remotely located with respect to the hub device, the updated radio protocol data may be pushed from the remote server(s) over a wide area network, such as a cellular telecommunications network. The hub device may thereafter disseminate the updated radio protocol data to other peer devices using a P2P distribution scheme, without further intervention by the remote server(s).

In some embodiments, the hub device may be configured to broadcast an indication to nearby peer devices (e.g., peer devices that are within a threshold distance from the hub device). The indication broadcast by the hub device may indicate to nearby peer devices that the hub device is in possession of the updated radio protocol data. One or more of the nearby peer devices may indicate to the hub device that they are ready to receive the updated radio protocol data from the hub device, and the hub device may send the updated radio protocol data to those peer devices over respective P2P connections between the hub device and the nearby peer device(s).

Individual peer devices that receive the updated radio protocol data from the hub device may be configured to forward the updated radio protocol data to other peer devices over P2P connections between the respective peer devices. Some peer devices may act as "pass-through devices," meaning that they do not actually implement the updated radio protocol data they receive, but merely act as a relay mechanism to propagate the updated radio protocol data to other peer devices. Some peer devices may implement the updated radio protocol data received from the hub device or from another peer device over a P2P connection. Upon implementation of the updated radio protocol data at the peer device, the peer device can be dynamically re-configured by updating a software defined radio (SDR) of the peer device to connect, and communicate, with other devices using the particular radio protocol.

P2P distribution of updated radio protocol data can significantly reduce the remote server's consumption of computing/networking resources (e.g., network bandwidth resources, processing resources, memory resources, etc.) when disseminating updated radio protocol data, as compared to the alternative of pushing updated radio protocol data directly from the remote server(s) to each individual peer device. Instead, the remote server(s) involved in the P2P distribution scheme described herein is no longer burdened after an initial transfer of updated radio protocol data from the remote server(s) to one or more hub devices. Said another way, after receiving the updated radio protocol data from the remote server(s), a hub device takes control of the radio protocol data distribution by disseminating the updated radio protocol data from the hub device to other peer devices, and the peer devices that receive the data may propagate the updated radio protocol data to further downstream peer devices, and so on and so forth. Seeing as how the number of hub devices deployed in the field is likely to be far fewer than the number of peer devices (e.g., user devices, IoT devices, etc.) deployed in the field, the initial transfer from remote server(s) to hub device(s) is not expected to be overly burdensome on the remote server(s).

The techniques and systems described herein may also allow peer devices that are unable to establish a connection with a remote update server(s) (sometimes referred to herein as "out-of-coverage" peer devices) to nevertheless receive updated radio protocol data. So long as a hub device is able to download updated radio protocol data, and is able to subsequently propagate the updated radio protocol data to one or more peer devices over a P2P connection, the updated radio protocol data may be received at an out-of-coverage peer device, notwithstanding the inability of that out-of-coverage peer device to connect with the remote server(s) where the updated radio protocol data may be maintained. This can improve user experience by providing a flexible distribution architecture for allowing some user devices that are unable to connect to a remote update server(s) to nevertheless receive updated radio protocol data from a peer device in its vicinity.

It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results.

FIG. 1 illustrates an overview of an exemplary system/network 100 for utilizing a hub device 102 to maintain an updated communication-bridge between a network of Internet-of-Things (IoT) physical objects 104 and a cellular telecommunications network 106 of a telecom carrier 108. The telecom network 106 may be any sort of telecom network and may comprise a core network and multiple access networks. Such a core network may include a number of network components providing connectivity between the cells of the telecom network 106, between cells of the telecom network 106 and those of other telecom networks, and between cells of the telecom network 106 and devices of other networks. The core network may support packet-switched communications, circuit-switched communications, or both. Further, the core network may be a System Architecture Evolution (SAE) core network or a UMTS core network, or may include network components from both. Also, the core network may include an Internet Protocol (IP) Multimedia subsystem (IMS) layer for supporting packet-switched communications. Further, the core network may include a server, as well as other devices. Such a server may be an over-the-air (OTA) server which provisions the hub device 102 and other devices with the virtualization scripts 112. The cellular telecommunications network 106 may typically include one or more radio access networks (RANs) 110 which may be based on a variety of PLTs. For example, RAN 110(1) may be configured based on a 3G PLT while RAN 110(2) may be configured based on a 4G PLT. The RANs 110 may be connected to the cellular telecom network 106 through one or more physical links interconnecting network nodes.

In some embodiments, the hub device 102 is deployed into the system/network 100 being configured to establish communication links with one or more PLTs but may lack compatibility with one or more PLTs which has yet to be fully developed and/or implemented. For example, the hub device 102 may be deployed at a time when the 4G RAN 110(2) is utilizing the most state of the art implemented PLT. Accordingly, when deployed the hub device 102 may be configured to be compatible with the 4G RAN 110(2) and optionally one or more legacy PLTs, e.g. the 3G RAN 110(1), such that wireless connections 114(1) and 114(2) may be established upon deployment but not wireless connection 114(N). Then at some future point in time and based at least partially on a scheduled implementation of future PLT RANs 110(N), e.g. a plurality of 5G RANs which are intended to surpass service capabilities of the current RANs, telecommunication carrier 108 may transmit updated PLT protocol data to the hub device 102 to achieve expanded functionality thereon. For example, a 5G Radio virtualization script 112(1) may be transmitted to the hub device 102 via the cellular telecommunications network 106 including the 4G RAN 110(2) and implemented by the hub device 102 to establish wireless connection 114(N) with the future PLT RAN 110(N). In this way, the hub device 102 may receive via a first PLT, e.g. 4G RAN 110(2), updated protocol data corresponding to a second PLT with which the hub device 102 is incompatible, e.g. 5G PLT RAN 110(N). Then, using this updated protocol data, the hub device 102 may be reconfigured on the fly to remove the incompatibility with the 5G PLT RAN.

While the foregoing description refers to 5G PLT technology as being an exemplary future PLT this should not be construed as limiting. Rather, other types of PLTs may be within the scope of a future PLT whether currently existing or subsequently developed. For example, technologies subsequently developed to replace 5G PLT RANs may be considered future PLTs. Moreover, currently existing PLTs which a device is incompatible with may also be a future PLT in the sense that compatibility with that PLT comes after the device is deployed. For example, a hub device affixed to a mobile vehicle may receive updated PLT protocol data corresponding to legacy PLTs as the vehicle travels into geographic regions supporting such legacy PLTs and use this updated protocol data to gain compatibility with the legacy protocols.

In some embodiments, the hub device 102 is configured to identify and select an optimal one of the RANs 110 based on one or more factors such as signal strength and/or realized data transmission rates. For example, the hub device 102 may receive updated PLT protocol data such as the 5G radio virtualization script 112(1) prior to the cellular telecommunication network 106 being fully updated with all future PLT RANs, e.g. fully implementing a PLT may require tens of thousands of new RANs 110(N). Therefore, in an area which has yet to be updated with a new RAN 110(N) one or more existing technologies, e.g. 110(2) or 110(1), may remain optimal in certain locations. In some embodiments, the hub device 102 is configured to periodically reassess which RAN PLT is optimal based on the one or more factors.

In some embodiments, the hub device 102 may also be deployed into the system/network 100 being configured to establish communication links with one or more IoT physical devices 104. For example, the hub device 102 may communicate with an IoT thermostat 104(1) which is configured to transmit field data, e.g. temperature readings taken from a physical environment, to one or both of a user device 116 or a third party service provider 118. Other exemplary IoT physical devices 104 include, but are not limited to, an IoT smart TV 104(2) and an IoT security system 104(N). Because the various IoT physical devices 104 possess differing core functionalities, different IoT protocols may be used across the devices 104. For example, the IoT thermostat 104(1) may operate on battery power (as opposed to being hardwired) and, as a result, may be configured to communicate via an IoT protocol which requires minimal power. In contrast, the IoT smart TV 104(2) may be unconstrained in terms of power consumption while requiring a high rate of data transfer in order to stream media content. Accordingly, the IoT smart TV 104(2) may be configured to communicate via a different IoT protocol than the IoT thermostat 104(1). The wide and ever increasing variety of applications for IoT devices has already led to the development of numerous IoT protocols and will undoubtedly lead to more. In some embodiments, the hub device 102 is dynamically re-configurable to support differing IoT protocols. For example, the hub device 102 may include one or more software defined radios (SDRs) which may be programmed, based on updated IoT protocol data, e.g. IoT virtualization script 112(2), received via the cellular telecom network 106.

Other types of virtualization scripts 112 may also be incorporated in various implementations. For example, in various implementations, any hardware, firmware, or software which may be added to a computing device, such as hub device 102, may be virtualized. For example, both a 5G radio 112(1) and a SIM card 112(3) may be hardware components that may be added to a computing device. To virtualize a given component of hardware or firmware, a circuit diagram may be automatically or manually created for that component, and a virtualization script 112, such as a Very High Speed Integrated Circuits (VHSIC) Hardware Description Language (VHDL) script, may be automatically or manually created for the circuit diagram. Virtualization script(s) 112 may then be provided (in compiled versions or otherwise) to the telecommunication network 106, to a server, or to both to enable OTA provisioning to computing devices such as the hub device 102, removing the need for physical addition of the componentry to those computing devices.

In some embodiments, the hub device 102 may be configured to connect to an internet service provider (ISP) 120 that provides internet service through one or more physical connections. For example, ISP 120 may provide internet service to a local area network through a coaxial cable or an optical fiber. In some embodiments, the physical connection may terminate at the hub device 102, e.g. a coaxial cable may screw into the hub device 102 which may also serve as a cable internet modem to service a local area network (LAN). In some embodiments, the physical connection may terminate at a modem external to the hub device 102 such as, for example, Wi-Fi modem device 122 which is configured to create a wireless local area network (WLAN) and the hub device 102 includes a wireless transceiver configured to communicate via the Wi-Fi modem device 122.

In some embodiments, the hub device 102 may be configured to selectively transmit data between a particular IoT physical device, e.g. IoT security system 104(N), and a third party service provider 118. For example, security system 104(N) may be configured to collect sensitive field data from a predefined area, e.g. a residential home, and the hub device 102 may act as an intermediary to relay secure communications between the IoT security system 104(N) and the 3rd party service provider 118.

In some embodiments, the hub device 102 may be configured to virtualize, in software on the hub device 102, one or more functionalities of nodes within the telecommunications network 106 (and/or the RANs 110 themselves). For example, the hub device 102 may virtualize the functionality of a Mobility Management Entity (MME) node of the telecommunications network 106 in software, and the hub device 102 may operate as a virtual MME using this virtualized functionality. Various other types of network nodes (e.g., Call Session Control Function (CSCF) nodes) can be virtualized in this manner, and combined with other virtualization software on the hub device 102, to render the hub device 102 capable of acting as a cellular network itself.

It should be appreciated that the exemplary telecommunication system/network 100 of FIG. 1 is intended to depict a simplified representation of a telecommunication network that can employ any mixture of telecommunication technologies which are commonly utilized in a real-world, heterogeneous telecommunication network including but not limited to 2G, 3G, 4G, and 5G access technologies and/or any combination of common wireless broadband communication technologies, including, but not limited to, Long Term Evolution (LTE)/LTE Advanced technology (LTE+), High-Speed Data Packet Access (HSDPA)/Evolved High-Speed Packet Access (HSPA+) technology, Universal Mobile Telecommunications System (UMTS) technology, Time Division Multiple Access (TDMA), Code Division Multiple Access (CDMA) technology, Evolution-Data Optimized (EVDO), Global System for Mobile Communications (GSM) technology, Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), IEEE 802.1x protocols, WiMax® technology, or WiFi® technology, Data Over Cable Service Interface Specification (DOCSIS), digital subscriber line (DSL), and/or any future IP-based network technology or evolution of an existing IP-based network technology. These diverse communication technologies are neither depicted nor described within the context of the telecommunication system/network 100 of FIG. 1, for the sake of brevity.

Figure 2:
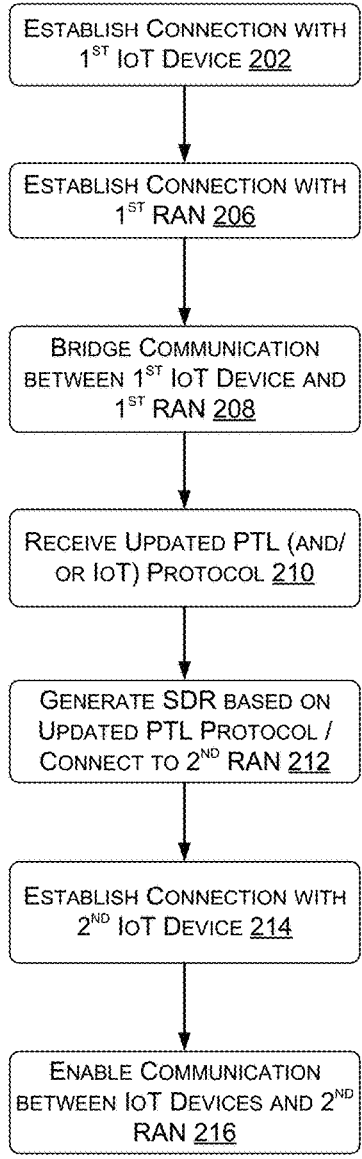
FIG. 2 is a pictorial flow diagram that shows an illustrative process of eliminating an incompatibility with one or more physical layer technologies (PLTs) and/or IoT protocols of a hub device configured to bridge communications between an IoT physical object network and a cellular telecom network.
Figure 2:
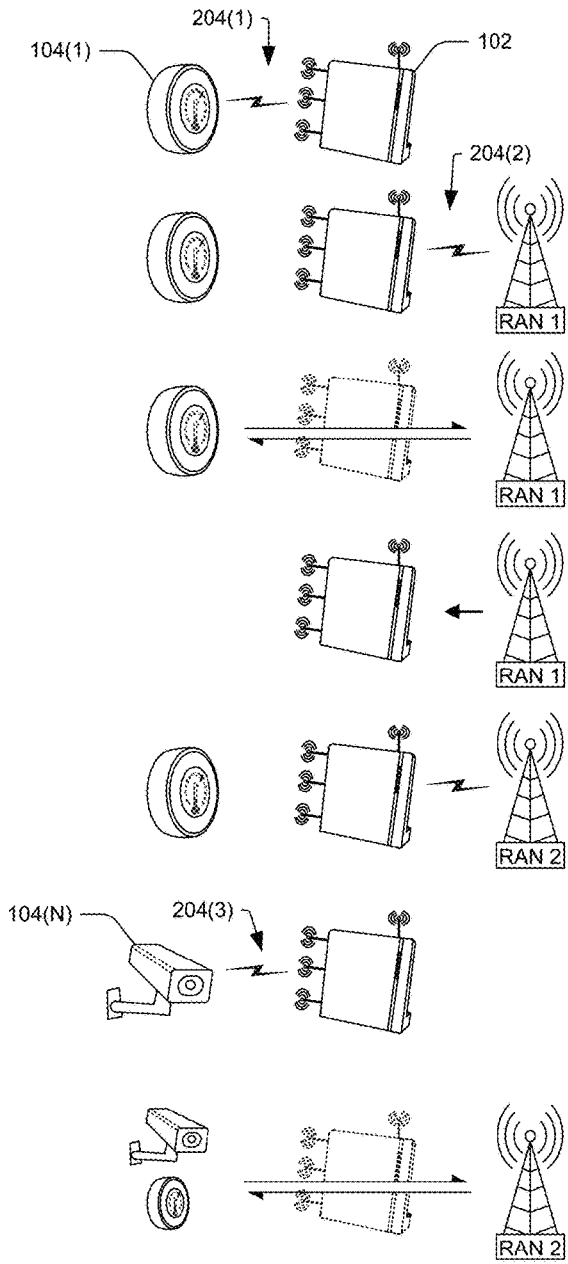

FIG. 2 is a pictorial flow diagram that shows an illustrative process of eliminating an incompatibility with one or more physical layer technologies and/or IoT protocols of a hub device that is configured to bridge communications between an IoT physical object network and a cellular telecom network. The order in which operations are described is not intended to be construed as a limitation, and any number of the described blocks can be combined in any order and/or in parallel to implement the process. Other processes described throughout this disclosure, in addition to process 200, shall be interpreted accordingly.

At block 202, a hub device 102 may establish a first connection 204(1) with a first IoT physical object 104(1) of an IoT physical object network. The IoT physical object network may include a single IoT physical object or multiple IoT physical objects which may be configured with similar or differing IoT communication protocols. For example, the first IoT physical object 104(1) may be configured to communicate via a particular IoT protocol designed to service applications which require relatively infrequent data exchanges at low rates of data transfer over a limited range such as, for example, a home or building. Such an IoT protocol may include, but is not limited to, the ZigBee 3.0 IoT protocol which is based on the IEEE 802.15.4 protocol.

In some embodiments, the first connection 204(1) is achieved utilizing a software defined radio (SDR). In particular, the hub device 102 be configured to perform radio frequency (RF) signal processing on one or more processors as opposed to special purpose hardware. For example, the hub device 102 may include one or more antennas which are capable of receiving and transmitting RF signals at one or more particular frequencies or bands of frequencies. These antennas may be connected to one or more SDRs which may be selectively programmed or re-configured to communicate via various IoT protocols (or PLT protocols for that matter). Accordingly, because the hub device 102 is capable of being dynamically reconfigured to communicate via various communication protocols, existing infrastructural constraints which are not application specific may be given little or no weight in selecting an appropriate IoT protocol for any particular application. One major existing infrastructural constraint is the current pervasiveness of protocols within intended use environments which biases many developers toward selecting WiFi™ protocols in the design of IoT physical devices despite the availability of more design appropriate IoT protocols. For example, there are currently numerous WiFi™ enabled thermostats on the market today largely because of the large number of homes which are outfitted with WiFi™ routers to provide wireless internet service. However, the WiFi™ protocol consumes more power than some other IoT protocols, which is fine for file and media transfers by devices which are frequently recharged; however, for other IoT applications, e.g. where high data transfer rates are not required but where low power consumption is, designers would likely forgo WiFi™ in favor of other protocols if those protocols could be easily added to existing infrastructure. Systems and methods disclosed herein provide a dynamically modifiable networking infrastructure and substantially eliminate the need for developers to consider infrastructural constraints in selecting an IoT protocol for a physical device. Rather, application specific considerations such as, for example, range, data requirements, security and power demands, and battery life may take precedence.

At block 206, the hub device 102 may establish a second connection 204(2) with a first radio access network (RAN 1), of a cellular telecom network, which is based on a first PLT. For example, the hub device 102 may connect to a 4G RAN of the cellular telecom network. In some embodiments, the second connection 204(2) is established with an SDR that is programmed according to the first PLT, e.g. an SDR that is configured based on 4G PLT protocol(s). For example, the hub device 102 may include one or more antennas capable of operating in a variety of different frequency bands assigned for cellular use and one or more SDRs may be coupled to the antenna(s). The SDR(s) may then be, at block 206, configured to receive and transmit data based on the first PLT.

At block 208, the hub device 102 may bridge communications between the first IoT physical object 104(1) and the cellular telecom network, and therefore the internet in general, through the connection with RAN 1. For example, the first IoT physical object 104(1) may be a home thermostat or a wearable technology utilizing an ultra-low power and low data transmission rate IoT protocol, e.g. SIGFOX®, and the hub device 102 may be configured to receive data from the first IoT physical object 104(1) based on the first IoT protocol and then transmit that data to the RAN 1 using the first PLT protocol, and vice versa.

At block 210, the hub device 102 may receive updated PLT protocol data from RAN 1. For example, the hub device 102 may receive, via the SDR that is programmed according to the first PLT, data that corresponds to the processing and/or generating signals in accordance with a second PLT which may be based on the same or different frequency bands as the first PLT. At block 212, the hub device 102 may generate a new SDR that is programed according to the second PLT, e.g. a 5G based PLT protocol(s). In some implementations, the new SDR is generated by flashing one or more field programmable gate arrays (FPGAs) to create specific electrical circuitry according to the second PLT. Moreover, in some implementations, the hub device 102 is incompatible with the second PLT prior to receiving the updated PLT protocol data and generating the new SDR based thereon. For example, although the hub device 102 may be dynamically reconfigurable, e.g. compatibilities with various technologies may be added or removed, the specific electrical circuitry defined by the updated PLT protocol data would not exist on the hub device 102 prior to being flashed onto the FPGA or otherwise replicated by one or more processor(s). Once the hub device 102 becomes compatible with the second PLT, the hub device 102 may connect to a second RAN (RAN 2). Upon connecting to RAN 2, the hub device 102 may bridge communications between the first IoT physical object and telecom network using the second PLT via RAN 2.

In some implementations, at block 210 or 212, the hub device 102 also receives updated IoT protocol data that corresponds to at least a second IoT protocol that the hub device 102 is currently incompatible with. Using the updated IoT protocol data, the hub device 102 may be dynamically reconfigured for compatibility with the second IoT protocol. For example, the hub device 102 may generate a new SDR that is programed according to the second IoT protocol, e.g. a LoRaWAN based IoT protocol. Then, at block 214, a connection 204(3) may be established with a second IoT physical object, e.g. security system 104(N), by the hub device 102.

At block 216, the hub device 102 may bridge communications between the second IoT physical object 104(N) and the cellular telecom network, and therefore the internet in general, through the connection with RAN 2 even though the hub device 102 supported neither of the second PLT protocol nor the second IoT protocol when originally deployed. In some implementations, a configuration manager dashboard is provided to enable a user of the hub device 102 to select which PLT and/or IoT protocols for the hub device 102 to support. For example, a user of the hub device 102 may wish to add the second IoT physical object, e.g. the security system 104(N), to the physical object network but may be unable to establish the connection due to the hub device 102 being incompatible with the second IoT protocol. Moreover, due to this incompatibility the hub device 102 may not even be able to "see," e.g. by scanning for the presence of, the second IoT physical object. Therefore, in some implementations, a user may specify through the configuration manager dashboard for updated IoT protocol data that corresponds at least to the second IoT protocol to be transmitted to the hub device 102 to achieve compatibility with the second IoT protocol and, ultimately, the second IoT device. For example, the configuration manager dashboard may be operable by way of a user device application, e.g. a smartphone app, or more generically as a web portal application accessible from any device capable of accessing the internet.

In some implementations, the configuration manager dashboard includes or has access to a directory of IoT physical objects and corresponding IoT protocols. For example, a user may purchase a new IoT physical device which uses a new IoT protocol that the hub device 102 is incompatible with at the time of the purchase but also reconfigurable for compatibility, e.g. by generating one or more new SDRs to establish connections using the new IoT protocol. When the user wishes to wirelessly connect the new IoT physical device to the hub device, the user may identify the new IoT physical device within the configuration manager dashboard. This may then cause updated IoT protocol data to be transmitted to the hub device 102 that corresponds to new IoT physical device.

In some implementations, the updated protocol data includes a variety of IoT protocols without regard to whether the IoT protocols are specified as being present in the physical object network. For example, the hub device 102 may periodically receive data corresponding to any new IoT protocols which some IoT devices are utilizing or may utilize in the future. In some implementations, the hub device 102 may be configured to dynamically reconfigure itself for capability with one or more of the variety of IoT protocols during a "scan" for IoT physical objects to add to the physical object network. For example, rather than requiring a user to specify any IoT protocols to add to the compatibilities of the hub device 102, the hub device 102 may dynamically cycle through these IoT protocols to scan for IoT devices in a "pairing mode," e.g. by generating SDRs for one or more particular ones of the variety of IoT protocols.

Figure 3:
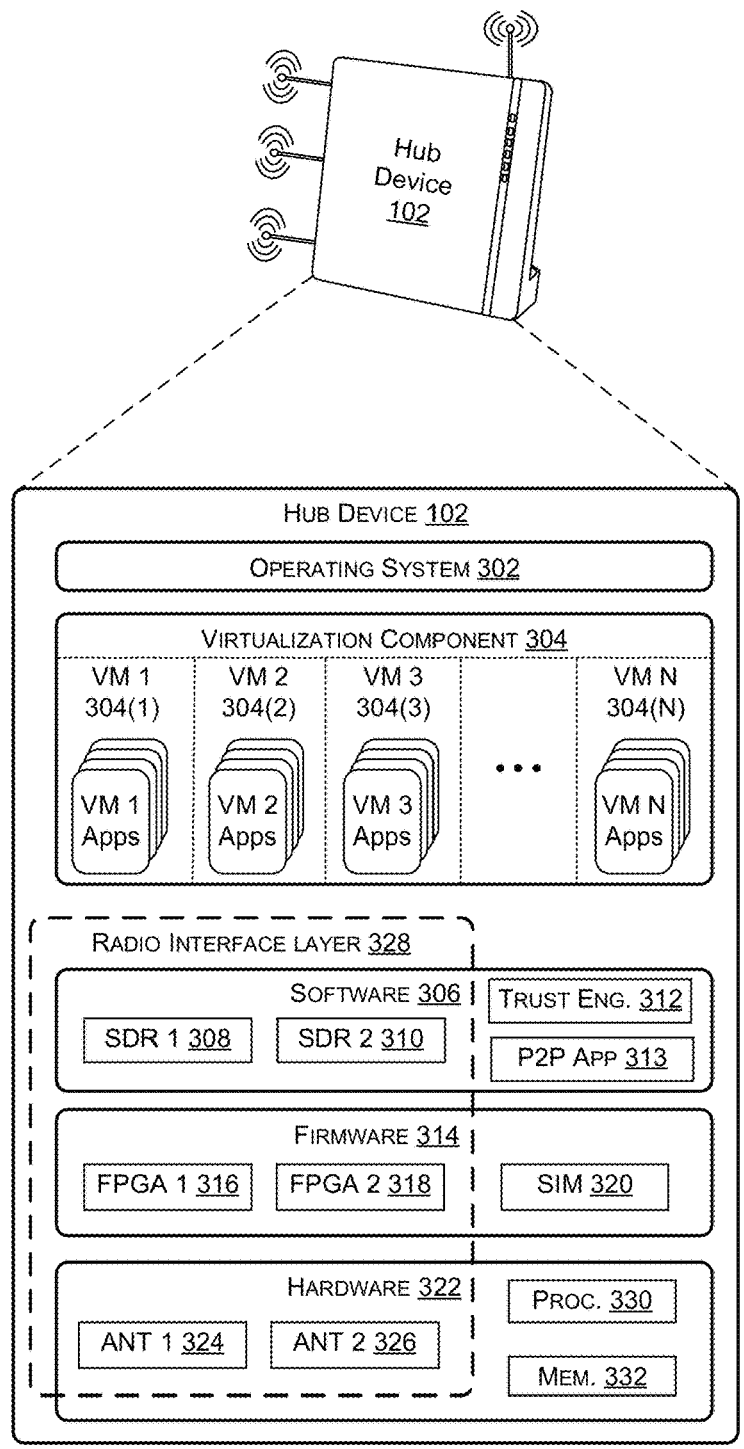
FIG. 3 is an example hub device hardware and software platform employed in maintaining an updated communication bridge between an IoT physical object network and a cellular telecom network, in accordance with embodiments of the disclosure.

FIG. 3 is an example hub device hardware and software platform employed in maintaining an updated communication bridge between an IoT physical object network and a cellular telecom network. Various embodiments of the hub device 102 may be provisioned with an operating system 302 and a virtualization component 304 that operates one or more virtual machines and/or virtual containers 304(1)-304 (N). Various embodiments of the hub device 102 may also be provisioned with various components of software 306, firmware 314, and/or hardware 322 some or all of which may correspond to a radio interface layer 328.

The operating system (OS) 302 may be any sort of operating system and may enable the operation of one or more of the virtualization component 304, application(s) of the software 306, or components of the firmware 314 or hardware 322. The OS 302 may also include any device driver(s) which serve as application programming interfaces (APIs) for configuring firmware components, e.g. FPGAs 316 or 318, based on updated PLT and/or IoT protocol data and for utilizing the FPGAs for communications with RANs 110.

In some embodiments, the virtualization component 304 may be operable to securely implement one or more virtual machines or containers each of which may run one or more corresponding applications. For example, the virtualization component 304 may securely implement a first virtual machine 304(1) that emulates a dedicated computer system running the corresponding applications. In some embodiments, the corresponding applications may be third party applications that correspond to third party services and/or particular IoT physical devices. For example, a third party home security service provider may provide one or more applications which correspond to security system 104(N). Due to the sensitive nature of field data that the security system 104(N) will collect during normal operation, some embodiments of the hub device 102 are configured to virtually isolate applications and corresponding field data within individual virtual machines or containers 304. In a configuration in which virtual machine 1 (VM 1) is dedicated to the security system 104(N), third party applications corresponding to the security system 104(N) may be securely run within VM 1 such that these applications and any field data collected by the security system 104(N) is virtually isolated from any other applications and/or field data collected from any other IoT physical devices 104. For example, field data collected by thermostat 104(1) is virtually isolated from field data collected by security system 104(N). Accordingly, various levels of security may be created and maintained on an individual IoT device level. Moreover, particular IoT devices for which field data is relatively insensitive in nature may operate with lesser security than other IoT devices without affecting the security levels of the other IoT devices. For example, in the event that security is breached with regard to the smart TV 104(2) (the field data of which may be limited to fairly insensitive data such as television show preferences) the field data of the security system 104(N) may remain secure.

In some embodiments, the virtualization component 304, and/or individual virtual machines or containers thereof, may encrypt field data received from one or more IoT devices 104 prior to transmitting the field data to a corresponding third party service provider. For example, an application provided by the third party home security service provider may be operated on virtual machine 304(1) which may encrypt the field data prior to any component of a radio interface layer 328 transmitting the field data to the home security service provider. In some embodiments, the hub device or virtualization component may be configured to initiate a registration of individual IoT physical devices, e.g. security system 104(N), with a corresponding third party service provider, e.g. home security service provider. Initiation of the registration may cause a dedicated virtual machine or container to be created on the virtualization component 304. Moreover, in some implementations, the third party service provider may respond to the registration by providing the virtualization component or the dedicated virtual machine or container with a cryptographic key usable to encrypt field data prior to transmission through the radio interface layer 328. Accordingly, field data collected from an individual IoT device may be isolated within a dedicated virtual machine and encrypted, e.g. with an asymmetric key the corresponding key of which is never transmitted to the hub device 102.

In some implementations, the software 306 includes a trust engine 312 for managing access to various components of the hub device 102. For example, the trust engine 312 may generate and/or manage one or more cryptographic keys by relaying the keys to various components of the hub device 102 and or various third parties which may receive data transmitted through the hub device 102. In some implementations, the trust engine 312 may cause field data to be encrypted immediately upon initial receipt at the radio interface layer 328. For example, the trust engine 312 may monitor individual communications received from individual IoT devices 104 and may immediately encrypt such field data. The trust engine 312 may provide decryption means, e.g. an asymmetric key, to individual virtual machines or third party service providers.

In some embodiments, a radio interface layer 328 may comprise one or more SDRs 308 and 310, one or more FPGAs 316 & 318, one or more antennas 324 & 326, or any combination thereof. Radio interface layer 328 may enable dynamic configuration of and/or communication between the SDRs FPGAs and/or the antennas in order to completely emulate hardware functionality needed for communication with or by IoT devices and/or wireless communication radios, e.g. RANs. Accordingly, rather than physically modifying the hub device 102 to add the hardware—often an expensive and time consuming exercise that slows the adoption of new technologies and/or locks consumers into old technologies due to infrastructural constraints—such hardware (e.g. a 5G radio, a SIM card, or a ZigBee radio) may be described in one or more virtualization scripts 112, such as VHDL scripts, which describes the circuitry of corresponding hardware in programming language. Such virtualization scripts 112 (in compiled versions or otherwise) may be provided OTA to the hub device 102 through the telecom network 106 and may be applied to portions of the FPGAs and/or SDRs to create hardware equivalents on the radio interface layer 328. "Generating a SDR," or "updating a SDR," as used herein, may include, for example, modifying, changing, replacing, or upgrading existing software (e.g., SDR software—executed in user space, kernel space, or partially in both user space and kernel space, SDR drivers within the OS 304 kernel, SDR firmware, etc.) of the individual SDRs, or installing new software (e.g., SDR software, SDR drivers within the OS 304 kernel, SDR firmware, etc.) for a new SDR. In some embodiments, this may involve flashing a signed software image and/or a signed firmware image to the hub device 102. Thus, the hub device 102 may be reconfigured to operate with new settings for a generated SDR, which are different settings as compared to previous settings the hub device 102 may have used with a previous/existing SDR. Changing from first SDR settings to second SDR settings may require a reboot of the hub device 102, in some cases, before the second settings can be implemented.

The radio interface layer 328 may be an application programming interface which enables components of the operating system 302, the virtualization component 304, and/or various virtual machines, e.g. 304(1), and applications thereof, to communicate with the SDRs, FPGAs, and/or antennas. The radio interface layer 328 may comprise software of the SDRs or FPGAs, software of the OS 302, software of the virtualization component 304, separate software, or some combination thereof.

In some embodiments, the hub device 102 may include at least one IoT side antenna and at least one RAN side antenna. For example, in some embodiments, antenna 324 may serve as an IoT side antenna and may be configured for communication with one or more IoT devices. For example, antenna 324 may be designed for optimal communication efficiency at one or both of 2.4 GHz or 5 GHz due to the wide array of currently available IoT devices utilizing these frequencies. In some embodiments, one or both of SDR 1 308 and/or FPGA 1 316 receives RF signals from antenna 324 and processes the received RF signals to communicate using various IoT protocols. In some embodiments, one or both of the SDR 1 308 and FPGA 316 may be overwritten (e.g., with updated SDR images, firmware images, etc.) to iteratively toggle between IoT protocols. For example, the hub device 102 may be periodically reconfigured, e.g. based on a predetermined schedule or a triggering event, to switch IoT compatibilities of the radio interface layer 328. In some embodiments, FPGA 316 makes up SDR 1 308 in part or in whole such that reconfiguring SDR 1 308 to communicate via a different IoT protocol includes reprogramming FPGA 1 316. In some embodiments, antenna 326 may serve as a RAN side antenna and may be configured for communication with telecom network 106 via one or more RANs. For example, antenna 326 may be designed for optimal communication efficiency at one or more of 900/1800/1900/2100 MHz due to these frequencies making up a majority or all of the currently designated cellular bands.

In some embodiments, the individual SDRs 308/310 may be operated to transmit and/or receive radio signals by setting a particular center point frequency, through an expected range of operation, with a set amount of bandwidth. For example, a spectrum (sometimes referred to as a "spectrum swath") that the SDR 310 is configured to operate within can be set to range from a lower bound (e.g., 300 megahertz (MHz)) to an upper bound (e.g., 3.6 gigahertz (GHz)). The lower and upper bounds of the spectrum swath may be limited by the hardware of the radio interface layer 328, such as the antennas 324/326, and the example range described herein is merely provided for illustrative purposes, and not limitation. For example, the antenna 326 may support a wider or narrower spectrum swath, such as a spectrum swath having an upper bound of 100 terahertz (THz), and/or a lower bound of 50 MHz, without departing from the basic characteristics of the techniques and systems described herein. Within the spectrum swath (e.g., 300 MHz to 3.6 GHz), the SDR 310, for example, can define a "slice of air" that is centered at a particular center point frequency, the "slice of air" being defined by a width in terms of the same frequency based units of the spectrum swath, such as a width of 50 MHz. When receiving radio signals, the SDR 310 is configured to detect radio signals in the designated "slice of air," and when transmitting radio signals, the SDR 310 is configured to transmit radio signals in the designated "slice of air." To enable a duplex communication system, the SDR 310 can define a first center point frequency for receiving radio signals, and a second, different center point frequency for transmitting radio signals, the "slice of air" for each of the receive and the transmit functions may be defined with different widths or the same width. In some embodiments, a guard band may be defined between the two "slices of air" in the duplex communication scenario. Whether or not duplex communication is enabled, the defined "slice of air" (e.g., 50 MHz slice) can be shifted one way or the other within the spectrum swath (e.g., within the 300 MHz to 3.6 GHz spectrum swath). When radio signals are received via the SDR 310, the signals are sent to a processor (e.g., the processor(s) 330, or a special purpose processor for the SDR 310 embedded in the hardware 322), which then processes the received radio signals to interpret the signals. This may involve the use of one or more filtering engines to filter the received signals.

The FPGAs may be any sort of FPGAs and may include reprogrammable circuitry (gates, wiring, etc.) which may be activated and deactivated. An equivalent of a given piece of hardware may be created in the FPGAs by activating parts of this reprogrammable circuitry. Thus, through such activation, the hub device 102 may have the equivalents of hardware without requiring the actual addition of that hardware.

Further, the hub device 102 may include other hardware components such as a processor 330, system memory 332, as well as other non-illustrated components such as removable storage, non-removable storage, and/or radios/modems. In some implementations, such processor(s) 330 are central processing unit(s) (CPU(s)), graphics processing unit(s) (GPU(s)), or both CPU(s) and GPU(s), or any other sort of processing unit(s).

In various implementations, system memory is volatile (such as RAM), non-volatile (such as ROM, flash memory, etc.) or some combination of the two. Additional data storage devices (removable and/or non-removable) may include, for example, magnetic disks, optical disks, or tape.

Non-transitory computer-readable media may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the hub device 102. Any such non-transitory computer-readable media may be part of the hub device 102.

In some implementations, the radios and/or modems include any sort of radio, modems, or combinations thereof known in the art. Such radios and/or modems may be in addition to the radios and/or modems created in parts of the FPGAs, as described above. For example, such additional radios and/or modems may include a radio transceiver that performs the function of transmitting and receiving radio frequency communications via an antenna. The radios and/or modems may facilitate wireless connectivity between the hub device 102 and various devices or one or more networks. In addition, the radios and/or modems may also include a wireless communication transceiver and a near field antenna for communicating over unlicensed wireless IP networks, such as local wireless data networks and personal area networks (e.g., Bluetooth or near field communication (NFC) networks). Further, the radios and/or modems may include wired communication components, such as an Ethernet port, that connect the hub device 102 in a wired fashion to devices of one or more networks.

FIG. 3 further shows that the software 306 of the hub device 102 may include a peer-to-peer (P2P) application 313, which is stored in the memory 332 and executable by the processor(s) 330 to perform various operations as described herein. The P2P application 313 of the hub device 102 may configure the hub device 102 to receive updated radio protocol data from a remote update server(s) and forward the data to one or more peer devices over respective P2P connections established between the hub device 102 and those peer devices. This P2P distribution scheme is discussed in more detail with reference to FIGS. 6-14.

Figure 4:
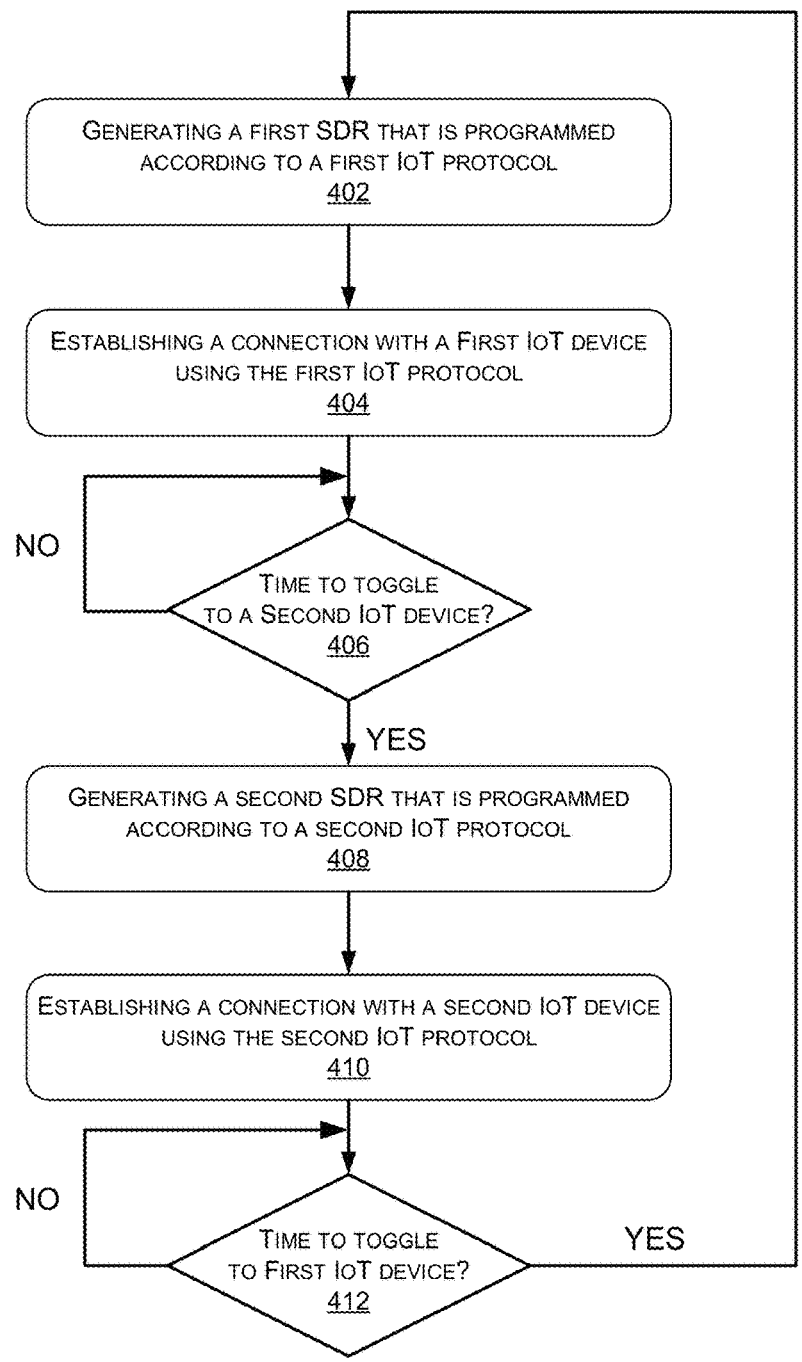
FIG. 4 is a flow chart of an example process for iteratively toggling between two or more IoT devices operating based on two or more IoT protocols, in accordance with embodiments of the disclosure.

FIG. 4 is a flow chart of an example process 400 for iteratively toggling between two or more IoT devices operating based on two or more IoT protocols, in accordance with embodiments of the disclosure.

At block 402, the hub device 102 may generate a first SDR that is programmed according to a first IoT protocol. For example, the hub device 102 may flash FPGA 1 316 to create specific electrical circuitry according to the first IoT protocol. Once the hub device 102 has generated the first SDR it may have gained a new ability to communicate via devices which utilize the first IoT protocol. At block 404, the hub device 102 may establish a connection with a first IoT device using the first IoT protocol.

Due to design constraints, the hub device 102 may include a finite number of FPGAs and, therefore, may only possess compatibility with a finite number of IoT protocols at any given instance in time. Systems and processes disclosed herein enable the hub device 102 to support a greater number of IoT protocols over a period of time than can supported at an instance in time. For example, suppose the hub device 102 includes only FPGAs 316 and 318. Further suppose that FPGA 318 is dedicated to supporting RAN side communications and that the hub device 102 must periodically collect information from at least two IoT devices that use different IoT protocols. By re-flashing FPGA 1 316 (which was used to generate the first SDR at block 402) with new circuitry to generate the second SDR at block 408, the hub device 102 may use a single FPGA to support multiple IoT protocols.

More specifically, at decision block 406, a determination may be made as to whether to toggle connections to a second IoT device. If no, then the hub device 102 may simply remain connected to the first IoT device and return to decision block 406 at a later time. If yes, then the process may proceed to block 408 at which the hub device 102 may generate a second SDR that is programmed according to a second IoT protocol. For example, the hub device 102 may re-flash FPGA 1 316 to create specific electrical circuitry according to the second IoT protocol. Once the hub device 102 has generated the second SDR it may have gained a new ability to communicate via devices which utilize the second IoT protocol. At block 410, the hub device 102 may establish a connection with the second IoT device using the second IoT protocol. Then, at decision block 412, a determination may be made as to whether to toggle connections back to the first IoT device. If no, then the hub device 102 may simply remain connected to the second IoT device and return to decision block 412 at a later time. If yes, then the process may proceed to back to block 402 (or to a later block if a third, fourth, etc IoT protocol must be supported) at which the hub device 102 may re-generate the first SDR that is programmed according to the first IoT protocol.

Figure 5:
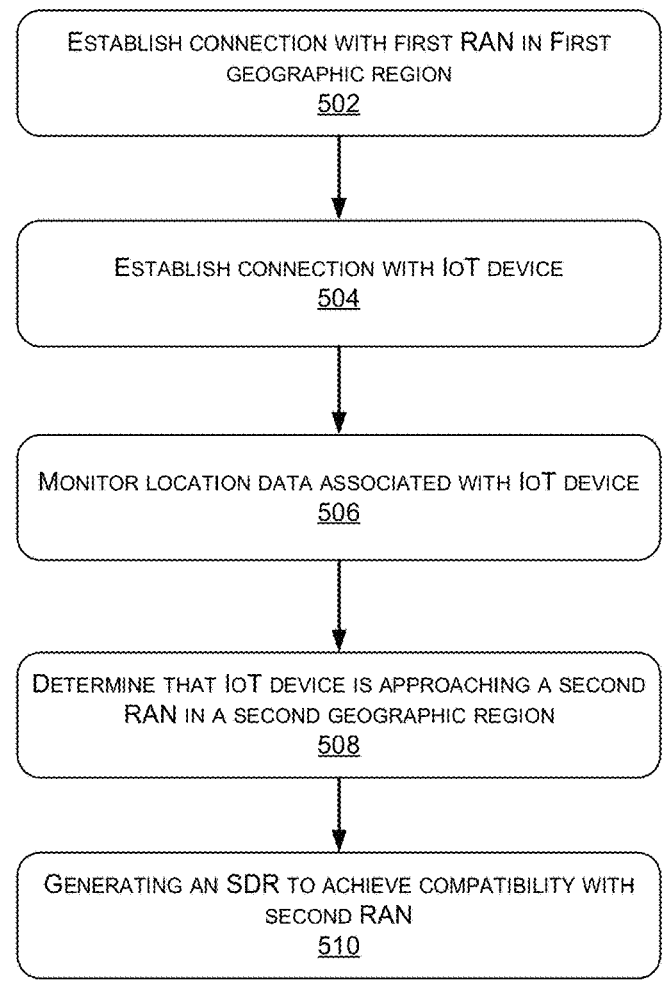
FIG. 5 is a flow chart of an example process for gaining compatibilities with one or more PLTs while approaching geographic regions which utilize radio access networks based on those PLTs, in accordance with embodiments of the disclosure.

FIG. 5 is a flow chart of an example process 500 for gaining compatibilities with one or more PLTs while approaching geographic regions which utilize radio access networks based on those PLTs, in accordance with embodiments of the disclosure.

At block 502, a hub device may establish a connection with a first RAN in a first geographic region. For example, the first geographic region may include a relatively state of the art 4G RAN network and the hub device may establish a connection with one or more individual RANs within this region as the hub device travels through the region. At block 504, the hub device may establish a connection with an IoT device configured to collect field data to be transmitted back to a remote entity. For example, the hub device may be affixed to a mobile vehicle and the hub device may be configured to collect field data associated with a refrigeration temperature of a produce transport trailer or a weight of a liquid fuel trailer, e.g. to ensure that fuel cargo is not removed without authorization during the travel and topped off with water as is a known problem in some regions of the globe.

At block 506, the hub device may monitor location data associated with the IoT device. For example, if the IoT device is a weight sensor on the fuel transport trailer then the location of the IoT device may be monitored and known to correspond to the location of the vehicle transporting the cargo. At block 508, a determination may be made, based on the location data monitored at block 506, that the IoT device is approaching a second geographic region which uses a different RAN PLT than the first region. For example, the hub device may be approaching a boundary between a region with 4G RANs and a region with 3G RANs with which the hub device is currently incompatible with. Then, at block 510, the hub device may generate a new SDR in order to achieve compatibility with the RAN PLT used in the region which the hub device is about to enter. For example, an SDR may be generated that creates a 3G radio to enable continued communication with the remote entity as the hub device travels through various regions that use different RAN PLTs.

Figure 6:
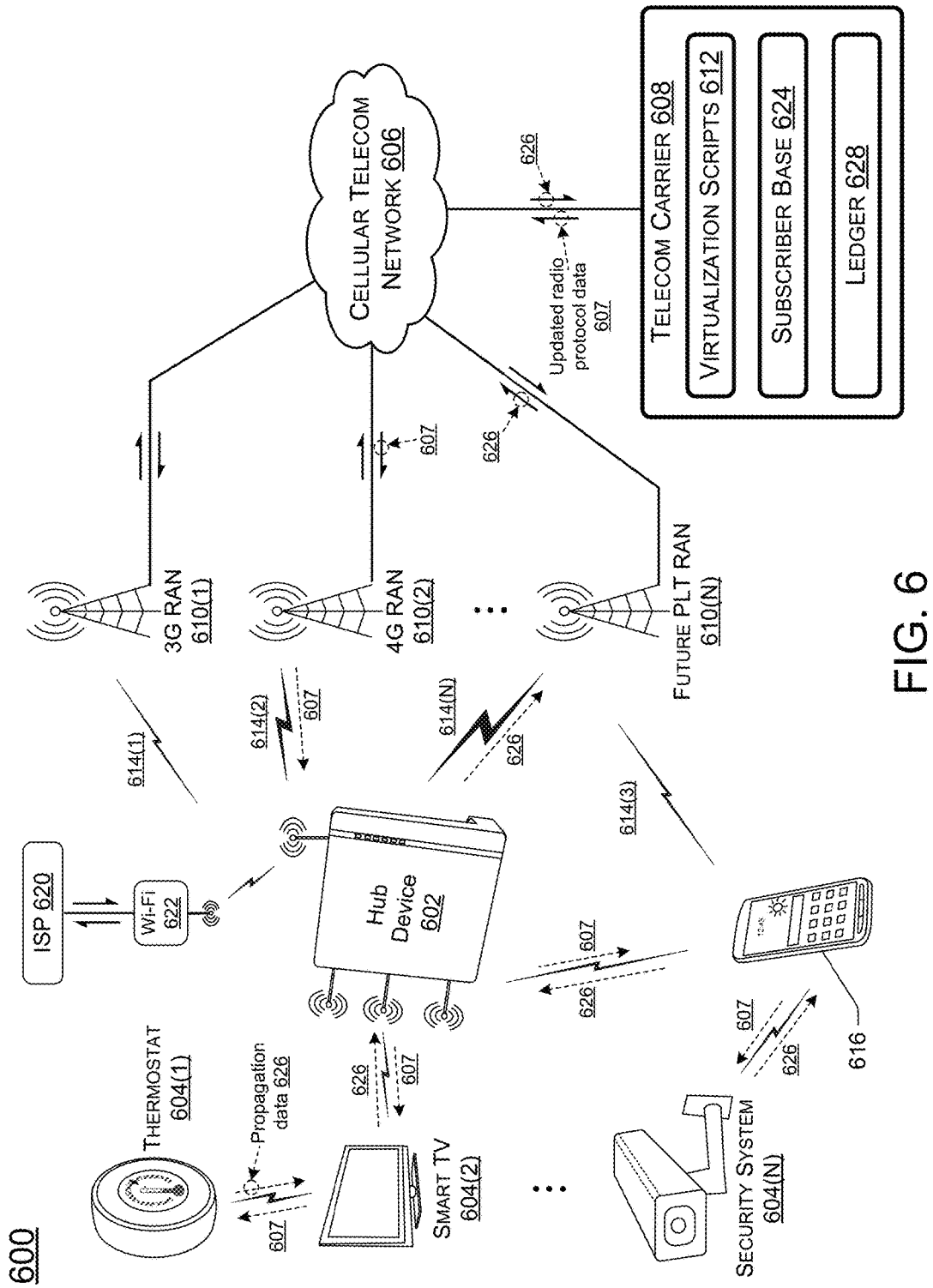
FIG. 6 illustrates an overview of an exemplary system/network for propagating updated radio protocol data in a peer-to-peer distribution scheme so that peer devices that are currently incompatible with a particular radio protocol can be dynamically reconfigured to communicate with other devices using the particular radio protocol, in accordance with various implementations of the disclosure.

FIG. 6 illustrates an overview of an exemplary system/network 600 for propagating updated radio protocol data in a peer-to-peer (P2P) distribution scheme. Using this P2P distribution scheme, peer devices that are currently incompatible with a particular radio protocol can be dynamically reconfigured to communicate with other devices using the particular radio protocol, all with minimal burden on the computing systems of the telecom carrier 608 to distribute the updated radio protocol data to the peer devices. The system/network 600 may include a hub device 602 configured to maintain an updated communication-bridge between a network of IoT physical devices 604 and a cellular telecommunications network 606 of a telecom carrier 608. In addition, the hub device 602 may be further configured to maintain an updated communication-bridge between one or more user devices 616 and the cellular telecommunications network 606. Similar to the telecom network 106 introduced with reference to FIG. 1, the telecom network 606 may be any sort of telecom network, as described herein.

The IoT devices 604 and the user devices 616 may be collectively referred to herein as "peer devices." An example peer device architecture is discussed in more detail with reference to the peer device 702 of FIG. 7. As such, a "peer device," as used herein, may include, without limitation, an IoT device 604, a user device 616, or any similar type of client computing device (whether associated with a user or not) that is deployable in the field and configured to communicate with other devices using one or more types of radio protocols. An IoT device 604, as described herein, may represent any suitable IoT object (e.g., an appliance, a sensor, a meter, etc.) that has an addressable interface (e.g., an IP address, a Bluetooth identifier (ID), a near-field communication (NFC) ID, etc.) and can exchange information and/or data with one or more other devices (e.g., the hub device 602) over a wireless and/or wireline network(s). An individual IoT device 604 may include a passive communication interface (e.g., a quick response (QR) code, a radio frequency (RFID) tag, a NFC tag, etc.), and/or an active communication interface (e.g., a modem, a transceiver, etc.). Example IoT devices 604 include, without limitation, thermostats, appliances (e.g., refrigerators, ovens, dishwashers, clothes washers/dryers, furnaces, etc.), sensors (e.g., cameras, light sensors, weather sensors, temperature sensors, electricity meters, gas meters, etc.), output devices (e.g., televisions, speakers, etc.), lights, vacuums, robots, and the like. So long as the IoT device 604 is equipped with appropriate electronics and an addressable communications interface for communicating with one or more connected devices, such as the hub device 602, the IoT devices 604 may represent any conceivable object/device. Similarly, the user device 616 may represent any suitable type of user device 616 including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, a television (smart television), a set-top-box (STB), a game console, a desktop computer, and/or any similar communication device. Accordingly, a "peer device" may encompass any of these example devices, and/or other similar devices known to a person having ordinary skill in the art.

The hub device 602 and the peer devices (e.g., the IoT devices 604 and the user device 616) described herein may be configured to participate in a P2P distribution scheme that allows for propagating updated radio protocol data 607 from a remote server(s) associated with the telecom carrier 608 to the hub device 602, and from the hub device 602 to one or more of the peer devices, as shown in FIG. 6. At least some of these peer devices that receive the updated radio protocol data 607 may be incompatible with a radio protocol corresponding to the updated radio protocol data 607. The hub device 602 itself may or may not be incompatible with the radio protocol corresponding to the updated radio protocol data 607. As such, a receiving device (e.g., peer device, hub device 602, etc.) that is already compatible with, or is unable to implement, the radio protocol in question, may act as a "relay" or "pass-through device," without actually implementing the radio protocol data 607. By contrast, a receiving device that is incompatible with, and is able to implement, the radio protocol in question, may implement the received radio protocol data 607 to dynamically re-configure a SDR of the receiving device to establish a connection, and communicate with, other devices using the radio protocol in question.

In the example of FIG. 6, the hub device 602 may initially receive, from a remote update server(s) associated with the telecom carrier 608, updated radio protocol data 607 over the telecommunications network 606. FIG. 6 shows the updated radio protocol data 607 being received at the hub device 602 via a RAN 610(2), such as a 4G RAN with which the hub device 602 is currently compatible. The updated radio protocol data 607 may include updated PLT protocol data corresponding a future radio protocol, e.g., 5G radio protocol to be implemented by a future PLT RAN 610(N). In an example, if the hub device 602 is deployed at a time when the 4G RAN 610(2) is utilizing the most state of the art implemented PLT, the hub device 602 may be compatible with the 4G RAN 610(2) and optionally one or more legacy PLTs, e.g. the 3G RAN 610(1), such that wireless connections 614(1) and 614(2) may be established upon deployment of the hub device 602. However, the hub device 602 may not be compatible with a new PLT communications protocol implemented by a future PLT RAN 610(N) at the time of the hub device's 602 deployment, and, as a result, the hub device 602 may not be configured to establish a wireless connection 614(N) with the PLT RAN 610(N) prior to receiving the updated radio protocol data 607. In this scenario, the hub device 602 may use the updated radio protocol data 607 to re-configure one or more components of a SDR 308 of the hub device 602 to convert the SDR 308 to a reconfigured SDR that is operable to establish a wireless connection 614(N), and communicate, with other devices—such as the devices of the future PLT RAN 610(N)—using the particular radio protocol associated with the updated radio protocol data 607, e.g., 5G radio protocol.

Alternatively, the hub device 602 may already be compatible with the particular radio protocol, e.g., 5G radio protocol, associated with the updated radio protocol data 607, and may not implement the updated radio protocol data 607 at the hub device 602 due to its preexisting compatibility. In either scenario (i.e., whether the hub device 602 locally implements the radio protocol data 607 or not), the hub device 602 may send the updated radio protocol data 607 to one or more peer devices in the system/network 600, without further involvement by the remote update server(s) associated with the telecom carrier 608. The distribution from the hub device 602 to any individual peer device in the system/network 600 may occur over a P2P connection between the hub device 602 and the receiving peer device. In an example, the user device 616 may not be compatible with a new PLT communications protocol implemented by a future PLT RAN 610(N) at the time of the user device's 616 deployment, and, as a result, the user device 616 may not be configured to establish a wireless connection 614(3) with the future PLT RAN 610(N) prior to receiving the updated radio protocol data 607 from the hub device 602. In this scenario, the hub device 602 may send, and the user device 616 may receive, the updated radio protocol data 607 over a P2P connection established between the hub device 602 and the user device 616. Transmitting data, such as the updated radio protocol data 607, over a P2P connection may be constrained to situations where the sending and receiving devices are within a threshold distance (e.g., 100 meters) from one another. Said another way, the sending and receiving devices may be collocated in a same, local environment. This may be the case when the P2P transfer of data cannot utilize the cellular telecommunications network 606, relying, instead, on another data transfer (or communications) protocol that allows for transferring data via communications over frequencies in the RF spectrum. In a P2P data transfer situation, the hub device 602 itself may be considered a "peer device," and it is to be appreciated that any use of the term "peer device" may also include the hub device 602, unless explicitly stated otherwise.

Data transfer over a P2P connection may occur over any type of communication that utilizes the RF spectrum. Thus, a P2P connection may include, without limitation, a connection over unlicensed RF spectrum, a connection over narrow band (NB) cellular, Bluetooth, WiFi, or any type of IoT communications protocol (e.g., Z-Wave™, Zigbee™, etc.). When either device of a pair of devices transferring updated radio protocol data 607 over a P2P connection are incompatible with the radio protocol associated with the data 607, the P2P connection may utilize a radio protocol or technology that is different from the particular radio protocol associated with the updated radio protocol data 607 being transferred.

The updated radio protocol data 607 may be implemented at the user device 616 in order to re-configure one or more components of a SDR of the user device 616. This may convert the SDR of the user device 616 to a reconfigured SDR that is operable to establish a wireless connection 614(3), and communicate, with other devices, such as the devices of the future PLT RAN 610(N), using the particular radio protocol associated with the updated radio protocol data 607, e.g., 5G radio protocol.

FIG. 6 also shows that the user device 616 may forward the updated radio protocol data 607 to another peer device, such as the IoT device 604(N), e.g., a security system, over a P2P connection established between the user device 616 and the IoT device 604(N). This may occur when the IoT device 604(N) is out of range of the hub device 602, but happens to be collocated in a same environment with the user device 616. In some cases, the user device 616 may move to a new location after receiving the updated radio protocol data 607 from the hub device 602, and in this new location, the user device 616 and the IoT device 604(N) may be collocated in an environment where a P2P transfer of data may occur between the user device 616 and the IoT device 604(N).

As mentioned, the user device 616 may act as a "relay" or "pass-through device," in some embodiments, meaning that the user device 616 may not implement the updated radio protocol data 607 at the user device 616, but may still receive and forward the updated radio protocol data 607 to other peer devices, such as the IoT device 604(N). This may be the case when the user device 616 does not include a SDR such that the user device 616 is incapable of being reconfigured using the updated radio protocol data 607. Alternatively, the user device 616 may already be compatible with the radio protocol (e.g., 5G radio protocol) associated with the updated radio protocol data 607. In the case where the user device 616 includes a reconfigurable SDR, and is incompatible with the radio protocol in question, the user device 616 may implement the updated radio protocol data 607 to dynamically re-configure itself to communicate using the particular radio protocol.

In another example with reference to FIG. 6, the updated radio protocol data 607 may represent data associated with a particular IoT protocol usable by at least one or more of the IoT devices 604. In this example, the IoT device 604(1) (e.g., a thermostat) and/or the IoT device 604(2) (e.g., a smart TV) may be incompatible with a particular IoT protocol prior to the dissemination of the updated radio protocol data 607. The hub device 602, after receiving the updated radio protocol data 607 from a remote server(s) associated with the telecom carrier 608, may send, over a P2P connection established with the IoT device 604(2), the updated radio protocol data 607 to the IoT device 604(2). If the IoT device 604(2) is incompatible with the particular IoT protocol corresponding to the updated radio protocol data 607 at the time of receipt, the IoT device 604(2) may implement the updated radio protocol data 607 (e.g., IoT protocol data) to re-configure one or more components of a SDR of the IoT device 604(2). This may convert a SDR of the IoT device 604(2) to a reconfigured SDR that is operable to establish a wireless connection, and communicate, with other devices, such as the user device 616, using the particular IoT protocol associated with the updated radio protocol data 607. FIG. 6 shows that the IoT device 604(2) may be further configured to forward the updated radio protocol data 607 to a downstream peer device, such as the IoT device 604(1) (e.g., the thermostat), so that the IoT device 604(1) can dynamically re-configure itself to be compatible with the particular IoT protocol. The IoT device 604(2) in the example of FIG. 6 may, in some cases, act as a pass-through device that does not actually implement the updated radio protocol data 607, but merely forwards the updated radio protocol data 607 to a downstream peer device over a P2P connection.

As described herein, the updated radio protocol data 607 may take various forms. For example, the updated radio protocol data 607 may include one or more virtualization scripts 612, such as VHDL data corresponding to a particular radio protocol or technology. In some embodiments, updating an SDR using the updated radio protocol data 607 may include flashing or imprinting a SDR image at the receiving device, and/or flashing a FPGA(s) to create electrical circuitry to perform RF signal processing for the updated radio protocol. Implementing the updated radio protocol data 607 at the hub device 602, or any other peer device having a configurable SDR, may include reprogramming (e.g., overwriting) an existing SDR on the device to generate a new or modified SDR that is appropriately programmed (e.g., with new settings) to render the device compatible with a radio protocol so that the device may communicate with other devices using the radio protocol. As mentioned elsewhere herein, a device may be re-configured to communicate over legacy radio protocols with which the device is currently incompatible. In other examples, the radio protocol associated with the updated radio protocol data 607 may include a future, to-be-implemented, radio protocol that was not available at the time a device was deployed in the field. A few exemplary scenarios (or use cases) will now be briefly discussed with reference to the system/network 600 of FIG. 6.

In a first example scenario of FIG. 6, the user device 616 may represent a smartphone that is compatible with LTE protocol, but is not compatible with 3G protocol. A user of the user device 616 may want to operate the user device 616 using the legacy 3G protocol in order to pull data from a smart utility meter that itself is compatible with 3G protocol, but not LTE protocol. Thus, the updated radio protocol data 607 in this example scenario may correspond to a legacy 3G protocol, and the user device 616 may implement the updated radio protocol data 607 at the user device 616 to dynamically re-configure the user device 616 to communicate with utility meter using the legacy 3G protocol.

In another example scenario of FIG. 6, the user device 616 may represent a smartphone that is in need of an upgrade to a previous version of the LTE protocol. The user device 616 may therefore be incompatible with a new version of the LTE protocol, and may be rendered compatible with the new version by implementing the updated radio protocol data 607 at the user device 616 after receiving the data 607 from the hub device 602.

In another example scenario of FIG. 6, an urban planning department of a municipality may have deployed IoT devices 604, such as the IoT device 604(N), throughout a geographic area for purposes of monitoring vehicle traffic in the geographic area. Some of the deployed IoT devices 604 may be deployed in rural locations within the geographic area where the IoT devices 604 do not have any cellular service (or at least poor radio coverage), and, as a result, one or more of the IoT devices 604 may be unable to communicate with a RAN 610 or with the hub device 602 in order to communicate over the telecommunications network 606. However, the IoT devices 604 may be strategically placed by the urban planning department at distances from one another so that respective pairs of IoT devices 604 can communicate with each other over established P2P connections that do not rely on communications through a RAN 610 or the telecommunications network 606. In this example scenario, one or more of the already-deployed IoT devices 604 may be incompatible with a newly-developed radio protocol (e.g., a new IoT protocol). Rather than replacing all of the deployed IoT devices 604 with replacement IoT devices that are compatible with the new radio technology, the IoT devices 604 can be dynamically re-configured in the field by distributing the updated radio protocol data 607 (e.g., updated IoT protocol data) to the IoT devices 604 using the P2P distribution scheme, as described herein. This may render individual ones of the IoT devices 604 compatible with the new radio protocol.

In another example scenario of FIG. 6, a geographic area may be experiencing an emergency/disaster situation (e.g., the aftermath of an earthquake, hurricane, or the like). During this emergency/disaster situation, a telecom carrier 608 may determine that a currently-utilized radio technology is having issues (e.g., interference in a particular frequency range), possibly due to damaged telecom equipment. The telecom carrier 608 may distribute updated radio protocol data 607 to one or more hub devices 602 in order to revert to an emergency legacy radio technology (e.g., 2G, 3G, etc.) in order to provide connectivity (or better radio coverage) to users of user devices, such as the user device 616. This example scenario can even extend beyond cellular communication platforms, such as by dynamically re-configuring peer devices (e.g., the user device 616) to be compatible with Land Mobile Radio Service (LMRS) technology/protocol, or a radio protocol using a different frequency spectrum (e.g., 900 MHz, unlicensed frequency, etc.). In this manner, peer devices may receive updated radio protocol data 607 over P2P connections with other peer devices (including the hub device(s) 602), and may be rendered operable to communicate using a different radio protocol to connect users in an emergency/disaster situation.

The aforementioned example scenarios are merely examples of how the P2P distribution of updated radio protocol data may be utilized. It is to be appreciated that the techniques and systems described herein may be utilized in various other applications.

Figure 7:
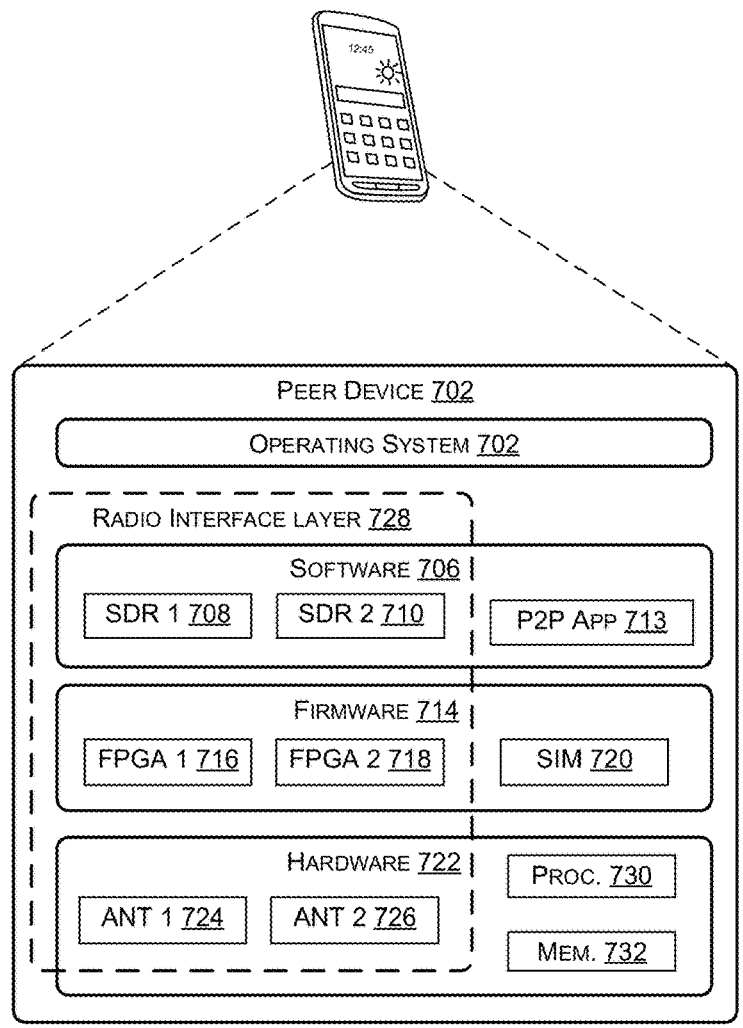
FIG. 7 is an example peer device hardware and software platform employed in propagating and implementing updated radio protocol data in a peer-to-peer distribution scheme, in accordance with embodiments of the disclosure.

Turning to FIG. 7, an example peer device 702 hardware and software platform is shown. The peer device 702 may be configured to propagate and implementing updated radio protocol data in a peer-to-peer (P2P) distribution scheme, in accordance with embodiments of the disclosure. The peer device 702 may represent any peer device described herein. FIG. 7 shows an example peer device 702 in the form of a user device, such as a smartphone, but other types of peer devices may include the same, or a similar, architecture as shown in FIG. 7.

Various embodiments of the peer device 702 may be provisioned with an operating system 702. Various embodiments of the peer device 702 may also be provisioned with various components of software 706, firmware 714, and/or hardware 722, some or all of which may correspond to a radio interface layer 728. The operating system (OS) 702 may be any sort of operating system and may enable the operation of one or more of application(s) of the software 706, or components of the firmware 714 or hardware 722. The OS 702 may also include any device driver(s) which serve as APIs for configuring software and/or firmware components based on updated radio protocol data (e.g., PLT and/or IoT protocol data) and for utilizing the SDRs and/or FPGAs for communications with RANs 110/610.

In some embodiments, a radio interface layer 728 may comprise one or more SDRs 708 and 710, one or more FPGAs 716 & 718, one or more antennas 724 & 726, or any combination thereof. Radio interface layer 728 may enable dynamic configuration of, and/or communication between, the SDRs, FPGAs and/or the antennas in order to completely emulate hardware functionality needed for communication with other devices (e.g., other user devices, IoT devices and/or wireless communication radios, e.g. RANs). Accordingly, rather than physically modifying the peer device 702 to add the hardware—often an expensive and time consuming exercise that slows the adoption of new technologies and/or locks consumers into old technologies due to infrastructural constraints—such hardware (e.g. a 5G radio, a SIM card, or a ZigBee radio) may be described in one or more virtualization scripts 112/612, such as VHDL scripts, which describes the circuitry of corresponding hardware in programming language. Such virtualization scripts 112/612 (in compiled versions or otherwise) may be provided in a P2P distribution scheme directly from the hub device 602 to the peer device 702, or from another peer device to the peer device 702, over a P2P connection. The virtualization scripts 112/612 may be applied to portions of the FPGAs and/or SDRs of the peer device 702 to create hardware equivalents on the radio interface layer 728. Thus, the peer device 702 may be reconfigured to operate with new settings for an updated/generated SDR, which are different settings as compared to previous settings the peer device 702 may have used with a previous/existing SDR. Changing from first SDR settings to second SDR settings may require a reboot of the peer device 702, in some cases, before the second settings can be implemented.

The radio interface layer 728 may be an API which enables components of the operating system 702 to communicate with the SDRs, FPGAs, and/or antennas. The radio interface layer 728 may comprise software of the SDRs or FPGAs, software of the OS 702, separate software, or some combination thereof.

In some embodiments, one or both of the SDR 708/710 and/or FPGA 716/718 receives RF signals from the antenna 724/726 and processes the received RF signals to communicate using various radio protocols (e.g., IoT protocols, PLT protocols, etc.). In some embodiments, one or both of the SDR 708/710 and FPGA 716/718 may be overwritten (e.g., with updated SDR images, firmware images, etc.) to switch to different radio protocols, as described herein.

Further, the peer device 702 may include other hardware components such as a processor 730, system memory 732, as well as other non-illustrated components such as removable storage, non-removable storage, and/or radios/modems. In some implementations, such processor(s) 730 are CPU(s), GPU(s), or both CPU(s) and GPU(s), or any other sort of processing unit(s).

In various implementations, system memory is volatile (such as RAM), non-volatile (such as ROM, flash memory, etc.) or some combination of the two. Additional data storage devices (removable and/or non-removable) may include, for example, magnetic disks, optical disks, or tape. The system memory 732 may include non-transitory computer-readable media, as described herein.

In some implementations, the radios and/or modems of the peer device 702 include any sort of radio, modems, or combinations thereof known in the art. Such radios and/or modems may be in addition to the radios and/or modems created in parts of the FPGAs, as described above. For example, such additional radios and/or modems may include a radio transceiver that performs the function of transmitting and receiving radio frequency communications via an antenna. The radios and/or modems may facilitate wireless connectivity between the peer device 702 and various devices or one or more networks. In addition, the radios and/or modems may also include a wireless communication transceiver and a near field antenna for communicating over unlicensed wireless IP networks, such as local wireless data networks and personal area networks (e.g., Bluetooth or NFC networks). Further, the radios and/or modems may include wired communication components, such as an Ethernet port, that connect the peer device 702 in a wired fashion to devices of one or more networks.

FIG. 7 further shows that the software 706 of the peer device 702 may include a peer-to-peer (P2P) application 713. The P2P application 713 of the peer device 702 may be stored in the memory 732 and executable by the processor(s) 730 to perform various operations, as described herein. For example, the peer device 702 may execute the P2P application 713 to receive updated radio protocol data 607 from a nearby peer device (including the hub device 602) over a P2P connection, and to forward the data 607 to one or more downstream peer devices over respective P2P connections established between the peer device 702 and those downstream peer devices.

As mentioned, the peer device 702 may represent a user device. In this scenario, the P2P application 713 may be downloaded by a user of the peer device 702 on demand, such as upon request from the user. The P2P application 713, when executed on the peer device 702, may output (e.g., generate and present) a user interface on a display of the peer device 702 that enables the user to provide user input to indicate whether the user wants to opt into a P2P distribution scheme for receiving and forwarding updated radio protocol data. The peer device 702 may be configured in an "opt-out" state by default (e.g., out of the box) so that the peer device 702 does not automatically receive updated radio protocol data 607 from a nearby peer device (including the hub device 602) without explicit approval from the user to opt into the service. When the peer device 702 does not represent a user device, the peer device 702 may be programed in the "opt-in" state (either by default or by an administrator) so that the peer device 702 automatically receives updated radio protocol data 607 from nearby peer devices, allowing for dynamically re-configuration of the peer device 702 in the field.

A user of the peer device 702 may be provided with an incentive(s) to opt into the P2P distribution service. For example, a user of the peer device 702 may receive a reward from the telecom carrier 608 (e.g., a percentage or fixed dollar amount reduction of a monthly bill for wireless services, perhaps applied over a set number of months) in exchange for participating in the P2P distribution service. The value of the incentive(s) (e.g., rewards) may be based on a metric that can be measured with respect to the peer device's 702 involvement in the P2P distribution scheme. For instance, the value of a reward provided to a user who participates in the P2P distribution service with his/her peer device 702 may depend on an amount of radio protocol data 607 the peer device 702 ends up forwarding to other peer devices over a period of time. As another example, the value of the reward may be based on a frequency at which the peer device 702 forwards radio protocol data. The user may opt into the P2P distribution service described herein using any conventional user input mechanism, such as by providing touch input to an "opt-in" button presented by the P2P application 713 executing on the peer device 702.

The P2P application 713 may further output (e.g., generate and present) a user interface requesting the user of the peer device 702 to define one or more groups of entities with respect to the P2P distribution scheme. For example, the user may specify or define, via the user interface, a first group of entities from which the user is willing to receive updated radio protocol data 607 at the peer device 702. This first group may be specified at any level of granularity. For instance, the user may specify a group including the user's family members, co-workers, or any limited set of users/entities from whom the user would like to receive updated radio protocol data 607. The user may specify or define, via the user interface, a "public" or "global" group that includes anyone with a peer device willing to send updated radio protocol data 607 over a P2P connection. This first group may include a hub device 602 (which may not be specified or defined by the user, but is automatically included in any group specified or defined by the user). The P2P application 713 may present predefined groups available for the user to select from, and/or the P2P application 713 may allow the user to define a custom group, such as by providing a user interface mechanism for the user to add contacts to a group.

In a similar manner, the user may specify or define, via the user interface, a second group of entities to which the user is willing to forward updated radio protocol data from the peer device 702. This second group can be a different group from the first group, or the two groups may be the same group.

In some embodiments, the user may be able to specify, using the P2P application 713, rules for enabling/disabling particular groups for receiving/sending updated radio protocol data 607. For example, the user can specify the following rule: if the peer device 702 is located at a geographic location corresponding to the user's home, enable receipt of updated radio protocol data 607 from a first group of entities comprised of family members, and disable receipt of data 607 from any other group of entities. Another rule may specify a different group (e.g., a public group) that is to be enabled if the peer device 702 moves to a different geographic location outside of the user's home. This might allow for the peer device 702 to receive updated radio protocol data 607 from peer devices of the user's family when the user is in his/her home, and to receive updated radio protocol data 607 from peer devices of the general public when the user is located in a public space. Group data, upon specifying or defining one or more groups, may be stored/maintained in local memory 732 of the peer device 702, and this stored group data may specify the particular groups selected and/or defined by the user via the P2P application 713.

User data, such as opt-in/opt-out data, group data, and the like, may, in some cases, be pushed to the remote server(s) of the telecom carrier 608 so that the user data may be maintained in a subscriber base 624 at the telecom carrier 608. Alternatively, this user data can remain at the local level by maintaining the user data at the peer devices 702 without pushing the user data to the telecom carrier 608.

The P2P application 713 may be further configured to output (e.g., generate and present) a user interface requesting the user of the peer device 702 to indicate a user preference for how he/she wants to receive updated radio protocol data 607—directly from remote update servers of the telecom carrier 608, or directly from another peer device, including the hub device 602. If a user indicates a preference for receiving updated radio protocol data 607 directly from a remote server(s) of the telecom carrier 608, the peer device 702 with this user preference setting may, upon becoming aware of a peer device (including a hub device 602) that is in possession of updated radio protocol data 607, determine whether the peer device 702 can establish a connection with a remote server(s) of the telecom carrier 608 over the telecommunications network 606. If a connection with the telecom carrier 608 cannot be established, the peer device 702 may resort to receiving the updated radio protocol data 607 directly from another peer device (including the hub device 602). Otherwise, if the user does not indicate such a user preference at the peer device 702, the peer device 702 may be configured to receive updated radio protocol data 607 directly from other peer devices (including the hub device 602) when the data becomes available, notwithstanding an available connection to a remote server(s) of the telecom carrier 608 that maintains the updated radio protocol data 607.

Figure 8:
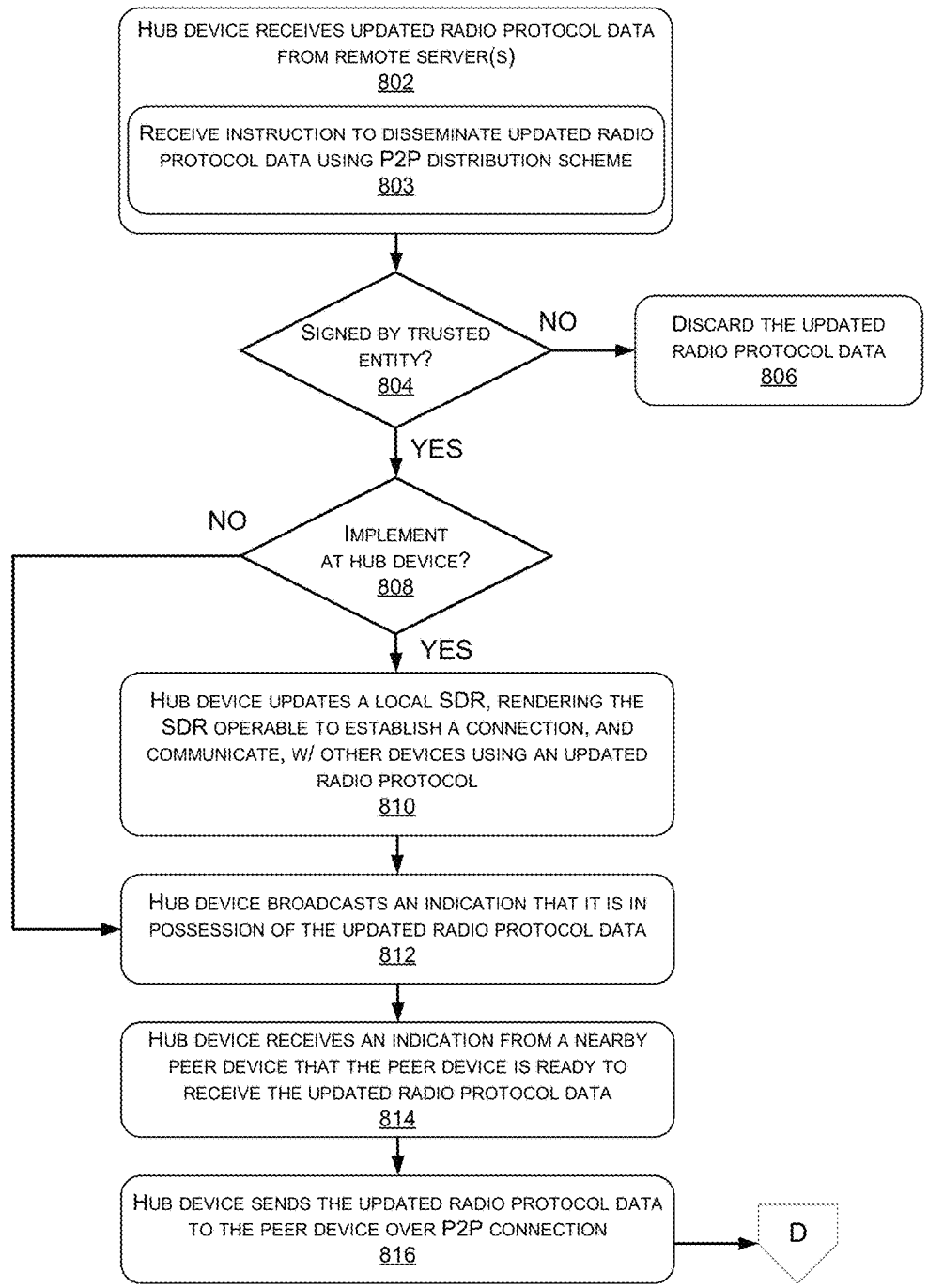
FIG. 8 is a flow chart of an example process to be implemented by a hub device when propagating update radio protocol data in a peer-to-peer distribution scheme, in accordance with embodiments of the disclosure.

FIG. 8 is a flow chart of an example process 800 to be implemented by a hub device 602 for propagating update radio protocol data in a peer-to-peer distribution scheme, in accordance with embodiments of the disclosure.

At block 802, a hub device 602 may receive, from a remote server(s), updated radio protocol data 607 that corresponds to a particular radio protocol. The remote server(s) may represent a remote OTA update server associated with a telecom carrier 608, and the data 607 may be received over a wide area network, such as a telecommunications network 606. The updated radio protocol data 607 may comprise PLT protocol data, IoT protocol data, or any other suitable type of radio protocol data that is usable to dynamically reconfigured devices with reconfigurable radio components to render those devices compatible with a particular radio protocol, as described herein.

At sub-block 803, the hub device 602 may receive (either in a same communication with the updated radio protocol data 607, or in a separate communication) an instruction to disseminate, without further intervention by the remote server(s), the updated radio protocol data 607 from the hub device 602 to peer devices over P2P connections. This may allow the radio protocol data 607 to be implemented on at least some of the peer devices that are incompatible with a particular radio protocol prior to receiving the updated radio protocol data 607.

In some embodiments, at block 804, a determination may be made as to whether the updated radio protocol data 607 (e.g., a software image, firmware image, virtualization script(s) 612, etc.) is signed by a trusted entity, such as the telecom carrier 608. This signature may be based on any suitable security technology, such as key signatures, certificates, or any other suitable mechanism. If it is determined, at block 804, that the data 607 is not signed by the trusted entity, the process 800 may follow the "no" route from block 804 to block 806 where the hub device 602 may discard the updated radio protocol data, without implementing it at the hub device 602 and/or forwarding it to other peer devices. This acts as a security mechanism to ensure that trusted, verified data 607 is being pushed out to the hub device 602, and subsequently to peer devices in the field. If it is determined at block 804, that the updated radio protocol data 607 is signed by the trusted entity, the process 800 may follow the "yes" route from block 804 to block 808.

In some embodiments, at block 808, a determination may be made as to whether the updated radio protocol data 607 is to be implemented at the hub device 602. This determination at block 808 may be made at any point during the process 800, and is not limited to being determined after the receipt of the updated radio protocol data 607 at block 802. For example, the hub device 602 may make the determination at block 808 earlier in the process 800, such as before the hub device 602 receives the updated radio protocol data 607, the hub device 602 knowing how it is going to handle the updated radio protocol data 607 prior to receipt of the data 607 at the hub device 602.

If it is determined, at block 808, that the hub device 602 is to implement the updated radio protocol data 607 thereon, the process 800 may follow the "yes" route from block 808 to block 810 where the hub device 602 may update, based at least in part on the updated radio protocol data 607, a SDR of the hub device 602, wherein the SDR of the hub device 602, after the updating, is operable to establish a connection, and communicate, with the other devices using the particular radio protocol associated with the updated radio protocol data 607. In some embodiments, the hub device 602, at block 810, maintains, in local memory of the hub device 602, an original version of the SDR that existed before the updating at block 810. This original version of the SDR may be utilized, if needed, to revert back to a previous radio protocol (e.g., when an issue with the updated radio protocol data 607 is detected after the fact).

Otherwise, if it is determined, at block 808, that the hub device 602 is not going to implement the updated radio protocol data 607 thereon (e.g., the hub device 602 may already be compatible with the radio protocol in question), the hub device 602 may follow the "no" route from block 808 to block 812, where the hub device 602 may forward the updated radio protocol data 607 to a peer device by performing the operations at blocks 812-816. Additionally, or alternatively, block 812 may be performed after the hub device 602 performs the operation at block 810, such as when the hub device 602 implements and forwards the updated radio protocol data 607.

At block 812, the hub device 602 may broadcast, within a local environment where the hub device 602 is located, an indication that the hub device 602 is in possession of the updated radio protocol data 607. This broadcast at block 812 lets other peer devices (including other hub devices) know that the hub device 602 has an available update that can be received and used by incompatible peer devices to reconfigure themselves to achieve expanded functionality by communicating over an updated radio protocol. The broadcast at block 812 may occur using any suitable communication protocol that utilizes the RF spectrum, such as a Bluetooth broadcast. In some cases, the broadcast has a limited range, such as a known range limit of Bluetooth.

At block 814, the hub device 602 may receive, from a peer device 702 that is located in the local environment with the hub device 602, an indication that the peer device 702 is ready to receive the updated radio protocol data 607 from the hub device 602. The peer device 702 may provide this indication to the hub device 602 at block 814 in response to various trigger events. For instance, the peer device 702 may be configured to periodically, or perhaps continuously, "listen" for broadcasts from nearby hub devices 602 and/or peer devices that are in possession of updated radio protocol data, and may provide the indication at block 814 in response to receiving or detecting the broadcast at block 812. For example, a background process or thread may execute at least periodically on the peer device 702 to scan for broadcasts from nearby devices, such as the broadcast at block 812 from the hub device 602, and to respond by providing the indication at block 814. Alternatively, the peer device 702 may periodically (e.g., every few seconds) broadcast an indication (e.g., a flag) on its own that is detectable by a nearby device (e.g., a hub device 602) in possession of updated radio protocol data 607. It may be the case that hub device 602 receives an indication at block 814 from a peer device 702 that is unable to establish a connection with a remote server(s) of the telecom carrier 608.

At block 816, the hub device 602 may send, over a P2P connection with the peer device 702, the updated radio protocol data 607 to the peer 702. If the peer device 702 is incompatible with the particular radio protocol being pushed out from the hub device 602, and if the peer device 702 includes a SDR 708/710 that is reconfigurable, the peer device 702 may utilize the updated radio protocol data 607 to update its local SDR 708/710 to be operable to establish a connection, and communicate, with other devices using the particular radio protocol. The peer device 702 may also forward the updated radio protocol data 607 to another peer device over a P2P connection. If the peer device 702 has opted into the P2P distribution service as a pass-through device, however, the peer device 702 may forward the updated radio protocol data 607 to another peer device without implementing the data 607 at the peer device 702.

Figure 9:
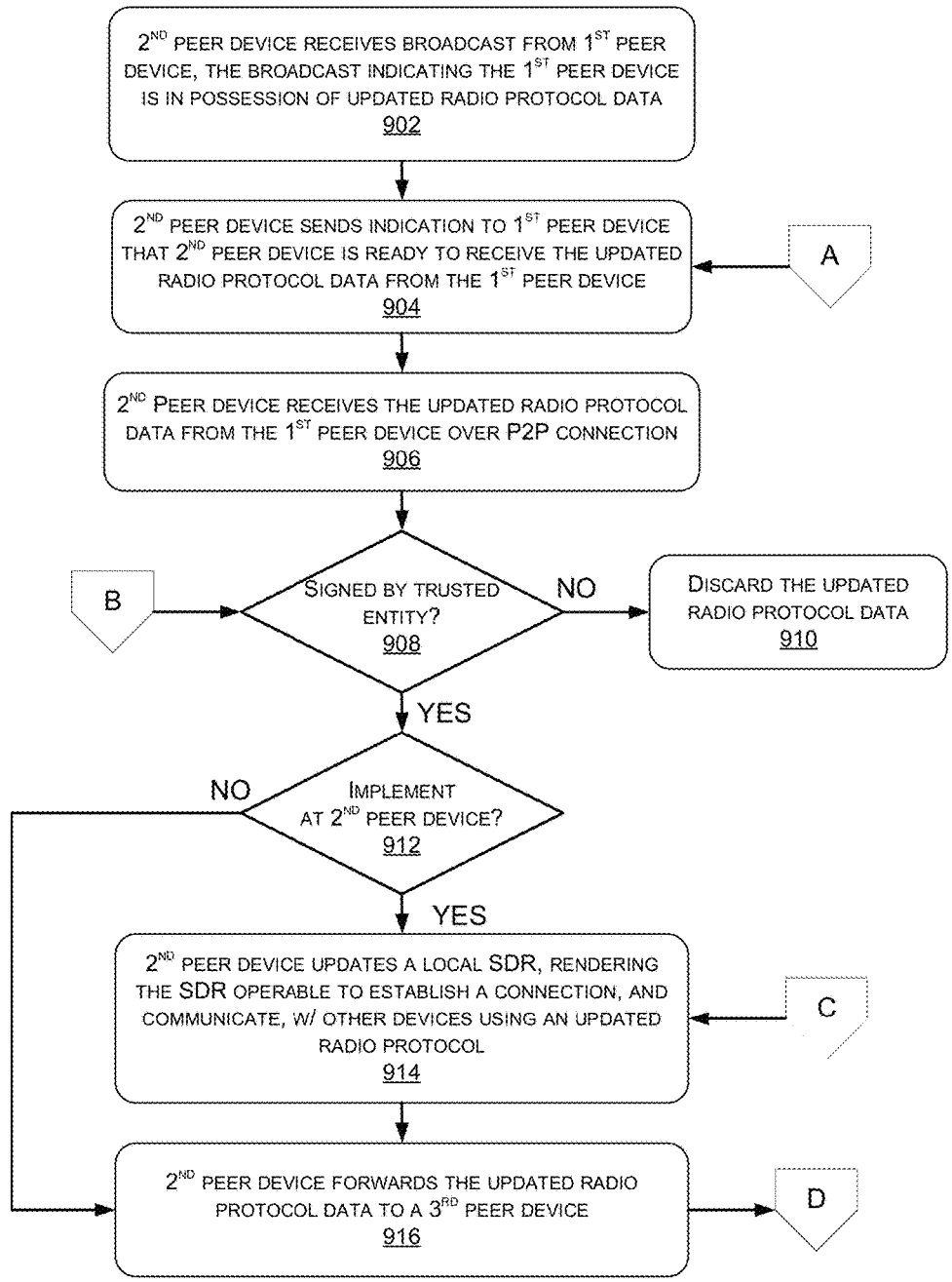
FIG. 9 is a flow chart of an example process to be implemented by a peer device when propagating update radio protocol data in a peer-to-peer distribution scheme, in accordance with embodiments of the disclosure.

FIG. 9 is a flow chart of an example process 900 to be implemented by a peer device 702 when propagating update radio protocol data in a peer-to-peer distribution scheme, in accordance with embodiments of the disclosure.

At block 902, a second peer device 702 (e.g., a user device 616, IoT device 604, etc.) may receive a broadcast from a first peer device (e.g., another user device 616, IoT device 604, the hub device 602, etc.) collocated in a local environment with the second peer device 702. The broadcast received at block 902 may include an indication that the first peer device (i.e., the broadcasting device) is in possession of updated radio protocol data 607 corresponding to particular radio protocol. This broadcast received at block 902 may be received over any suitable communication protocol that utilizes the RF spectrum, such as a Bluetooth broadcast.

At block 904, the second peer device 702 may send an indication to the first peer device that the second peer device 702 is ready to receive the updated radio protocol data from the first peer device. The second peer device 702 may send this indication to the first peer device in response to various trigger events, as described above (e.g., the second peer device 702 may periodically, or perhaps continuously, "listen" for broadcasts from nearby peer devices that are in possession of updated radio protocol data, and respond by sending the indication at block 904). For example, a background process or thread may execute on the second peer device 702 at block 904, at least periodically, in order to scan for broadcasts from nearby devices, such as the broadcast received at block 902, and the second peer device 702 may respond at block 904 by providing the indication to the first peer device. Alternatively, the second peer device 702 may periodically (e.g., every few seconds) broadcast an indication (e.g., a flag) at block 904 that is detectable by a nearby device (e.g., the first peer device) in possession of updated radio protocol data 607. It may be the case that the second peer device 702 sending the indication at block 904 is unable to establish a connection with a remote server(s) of the telecom carrier 608, and is unable to receive the updated radio protocol data 607 directly from the telecom carrier 608 as a consequence. In some embodiments, the second peer device 702 may first determine that it is incompatible with the particular radio protocol associated with the updated radio protocol data 607 prior to sending the indication at block 904, which sending may be conditioned on the second peer device 702 being incompatible with the particular radio protocol in question. Incompatibility in this regard may be determined in many possible ways, such as by comparing a make and model of the second peer device 702 to a list of make and model pairs that are included in the broadcast received at block 902, or comparing an existing radio protocol with which the second peer device 702 is compatible to a radio protocol associated with the updated radio protocol data 607 (perhaps included in the broadcast received at block 902).

At block 906, the second peer device 702 may receive, over a P2P connection with the first peer device, the updated radio protocol data 607 from the first peer device.

In some embodiments, at block 908, a determination may be made as to whether the updated radio protocol data 607 (e.g., a software image, firmware image, virtualization script(s) 612, etc.) is signed by a trusted entity, such as the telecom carrier 608. If it is determined, at block 908, that the data 607 is not signed by the trusted entity, the process 900 may follow the "no" route from block 908 to block 910 where the second peer device 702 may discard the updated radio protocol data 607, without implementing it at the second peer device 702 and/or forwarding it to other peer devices. If it is determined at block 908, that the updated radio protocol data 607 is signed by the trusted entity, the process 900 may follow the "yes" route from block 908 to block 912.

In some embodiments, at block 912, a determination may be made as to whether the updated radio protocol data 607 is to be implemented at the second peer device 702. This determination at block 912 may be made at any point during the process 900, and is not limited to being determined after the receipt of the updated radio protocol data 607 at block 906. For example, the second peer device 702 may make the determination at block 912 earlier in the process 900, such as before the second peer device 702 receives the updated radio protocol data 607, the second peer device 702 knowing how it is going to handle the updated radio protocol data 607 prior to receipt of the data 607 at the second peer device 702.

If it is determined, at block 912, that the second peer device 702 is to implement the updated radio protocol data 607 thereon, the process 900 may follow the "yes" route from block 912 to block 914 where the second peer device 702 may update, based at least in part on the updated radio protocol data 607, a SDR of the second peer device 702, wherein the SDR of the second peer device 702, after the updating, is operable to establish a connection, and communicate, with the other devices using the particular radio protocol associated with the updated radio protocol data 607. In some embodiments, the second peer device 702, at block 914, maintains, in local memory of the second peer device 702, an original version of the SDR that existed on the second peer device 702 before the updating at block 914. This original version may be utilized, if needed, to revert back to a previous radio protocol (e.g., when an issue with the updated radio protocol data 607 is detected after the fact).

Otherwise, if it is determined, at block 912, that the second peer device 702 is not going to implement the updated radio protocol data 607 thereon (e.g., the second device 702 may be operating as a pass-through device in the P2P distribution scheme), the second peer device 702 may follow the "no" route from block 912 to block 916 where the second peer device 702 may forward the updated radio protocol data 607 to a third peer device that is collocated in an environment with the second peer device 702. This may be the same environment where the first peer device is also located, or a different environment after movement the second peer device 702 to the different environment. Additionally, or alternatively, block 916 may be performed after the second peer device 702 performs the operation at block 914, such as when the second peer device 702 implements and forwards the updated radio protocol data 607. At block 916, the second peer device 702 may broadcast an indication that the second peer device 702 is in possession of the updated radio protocol data 607, receive an indication from the third peer device that the third peer device is ready to receive the updated radio protocol data from the second peer device 702, and send the updated radio protocol data to the third peer device over a P2P connection with the third peer device.

Figure 10:
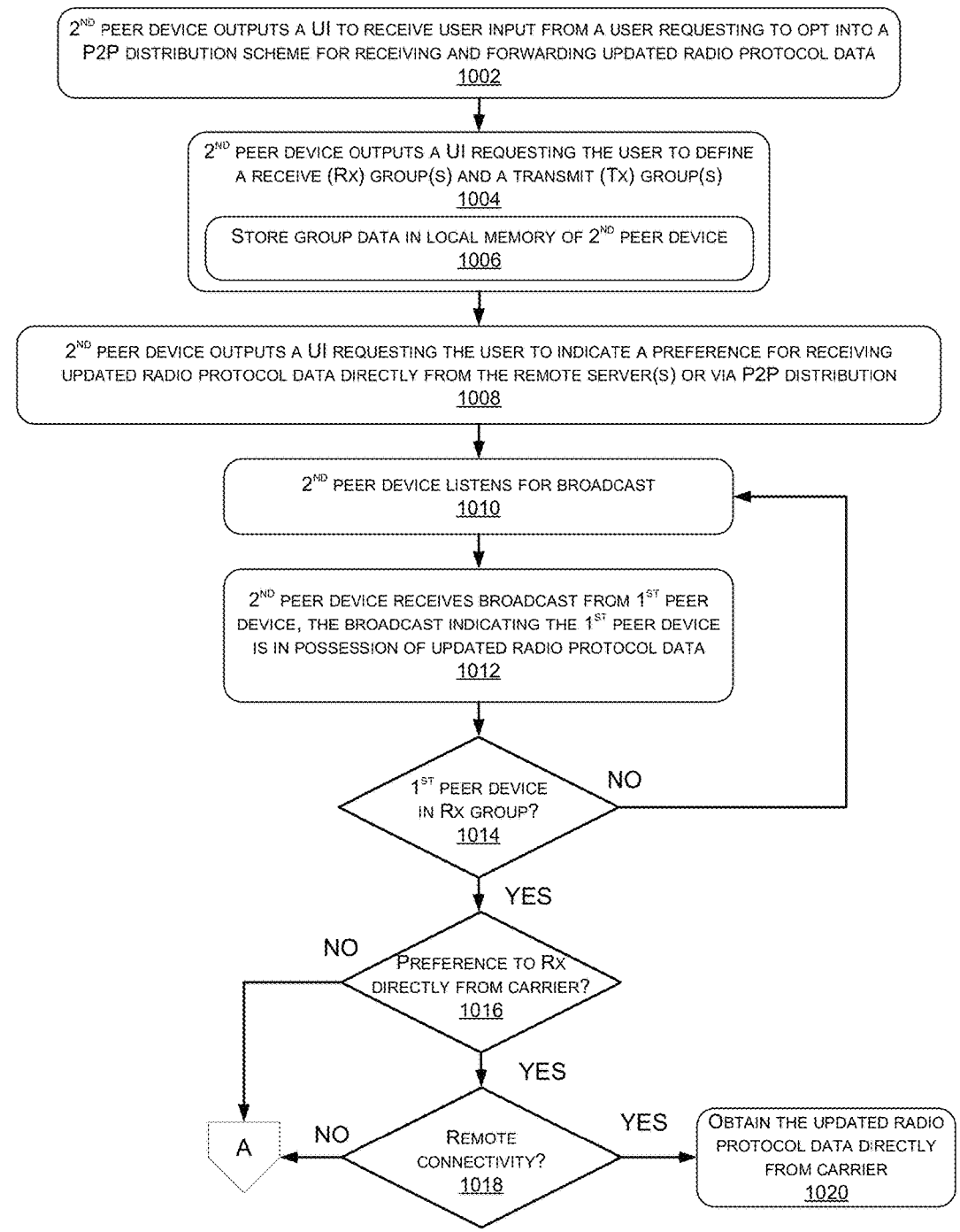
FIG. 10 is a flow chart of an example process to be implemented by a peer device for in the context of propagating update radio protocol data in a peer-to-peer distribution scheme, in accordance with embodiments of the disclosure.

FIG. 10 is a flow chart of an example process 1000 to be implemented by a peer device 702 for in the context of propagating update radio protocol data in a peer-to-peer distribution scheme, in accordance with embodiments of the disclosure.

At block 1002, a second peer device 702 may output a user interface on a display of the second peer device 702 requesting user input from a user to opt into a P2P distribution scheme for receiving and forwarding updated radio protocol data. The user interface may be output by a P2P application 713 executing on the second peer device 702. The user may opt into the P2P distribution scheme by selecting a soft button to "opt in". Accordingly, at block 1002, the second peer device 702 may receive user input from the user of the second peer device 702 requesting to opt into the P2P distribution scheme.

At block 1004, the second peer device 702 (perhaps responsive to the user opting into the P2P distribution scheme/service) may output a user interface on a display of the second peer device 702 requesting the user to define a first (receive) group of entities from which the user is willing to receive updated radio protocol data 607 at the second peer device 702, and a second (transmit) group of entities to which the user is willing to forward the updated radio protocol data 607 from the second peer device in the P2P distribution scheme. Accordingly, at block 1004, the second peer device 702 may receive user input specifying or defining the first (receive) group(s) and the second (transmit) group(s).

At sub-block 1006, the second peer device 702 may store group data in local memory 732 of the second peer device 702, the group data specifying the first (receive) group(s) and the second (transmit) group(s).

At block 1008, the second peer device may output a user interface on a display of the second peer device 702 requesting the user to indicate a user preference of whether the user prefers to receive the updated radio protocol data 607 at the second peer device 702 from another peer device via the P2P distribution scheme or directly from a remote update server(s) of a telecom carrier 608. Accordingly, at block 1008, the second peer device 702 may receive user input indicating the user preference for receiving the updated radio protocol data 607 via P2P distribution or directly from the remote server(s) of the telecom carrier 608.

At block 1010, the second peer device 702 may "listen" (e.g., via components of the radio interface layer 728) for a broadcast from a nearby device in possession of updated radio protocol data.

At block 1012, the second peer device 702 may receive a broadcast from a first peer device (e.g., another user device 616, IoT device 604, the hub device 602, etc.) collocated in a local environment with the second peer device 702. The broadcast received at block 1012 may include an indication that the first peer device (i.e., the broadcasting device) is in possession of updated radio protocol data 607 corresponding to particular radio protocol. This broadcast received at block 1012 may be received over any suitable communication protocol that utilizes the RF spectrum, such as a Bluetooth broadcast.

At block 1014, a determination may be made as to whether the first peer device (i.e., the broadcasting device) is a device within the first (receive) group specified in the group data maintained in the local memory 732 of the second peer device 702. For example, the first (receive) group may include family members of the user of the second peer device 702. If the first peer device is not within the first (receive) group, the process 1000 may follow the "no" route from block 1014 to block 1010, where the second peer device may continue to listen for another broadcast from the same device or a different device.

If, at block 1014, it is determined that the first peer device is within the first (receive) group, the process 1000 may follow the "yes" route from block 1014 to block 1016. It is to be appreciated that in a transmitting situation, a similar check may be made to determine if a downstream peer device is within the second (transmit) group, before forwarding the updated radio protocol data 607 to a downstream peer device (e.g., at block 916 of the process 900 of FIG. 9)

At block 1016, a determination may be made as to whether the user has indicated a user preference to receive the updated radio protocol data 607 at the second peer device 702 directly from a remote update server(s) of the telecom carrier 608. If it is determined, at block 1016, that the user preference to receive the updated radio protocol data 607 at the second peer device 702 directly from the remote update server(s) of the telecom carrier 608, the process 1000 may follow the "yes" route from block 1016 to block 1018 where an additional check may be made to determine whether the second peer device 702 can connect to the remote update server(s) of the telecom carrier 608 over the telecommunications network 606. If the second peer device 702 can connect to the remote update server(s) at block 1018, the process 1000 may follow the "yes" route from block 1018 to block 1020 where the second peer device 702 obtains the updated radio protocol data directly from the remote update server(s) of the telecom carrier 608.

If, at block 1016, there is no saved user preference to obtain updated radio protocol data 607 directly from the telecom carrier 608, or if, at block 1018, after determining that there is a saved user preference for receiving the data 607 directly from the telecom carrier 608, the second peer device 702 determines that it cannot connect to the remote server(s) of the telecom carrier 608 (e.g., due to poor radio coverage at a current geographic location), the process 1000 may follow the "no" route from either block 1016 or block 1018 to block 904 of the process 900 of FIG. 9, as shown by the off-page reference "A" in FIGS. 9 and 10. In other words, the second peer device 702 may proceed to obtain the updated radio protocol data 607 from the first peer device by following the "no" route from either block 1016 or block 1018.

Figure 11:
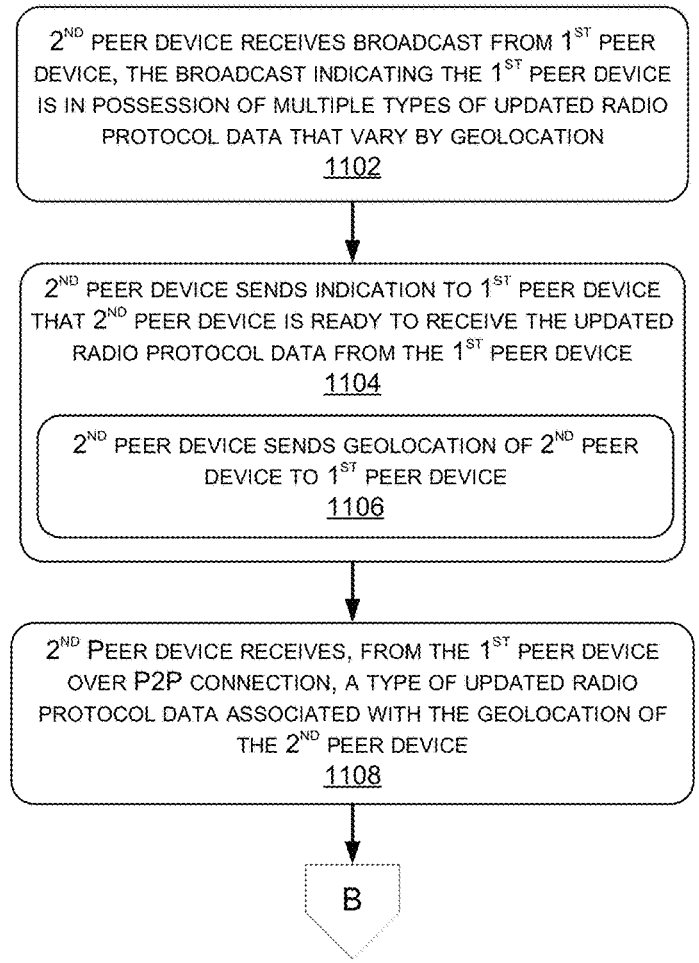
FIG. 11 is a flow chart of an example process to be implemented by a peer device for receiving update radio protocol data according to geolocation of the peer device, in accordance with embodiments of the disclosure.

FIG. 11 is a flow chart of an example process 1100 to be implemented by a peer device 702 for receiving update radio protocol data according to geolocation of the peer device 702, in accordance with embodiments of the disclosure.

At block 1102, a second peer device 702 (e.g., a user device 616, IoT device 604, etc.) may receive a broadcast from a first peer device (e.g., another user device 616, IoT device 604, the hub device 602, etc.) collocated in a local environment with the second peer device 702. The broadcast received at block 1102 may include an indication that the first peer device (i.e., the broadcasting device) is in possession of multiple types of updated radio protocol data 607, each type corresponding to particular radio protocol associated with a geographic location or area. For example, an update may push out different radio protocols (or different versions of the same radio protocol) for various geographies due to the differing radio equipment in those respective geographies. For instance, a first geographic area may support a legacy radio technology (e.g., 3G), while a second geographic area may support a LTE radio technology.

At block 1104, the second peer device 702 may send an indication to the first peer device that the second peer device 702 is ready to receive the updated radio protocol data from the first peer device. At sub-block 1106, the second peer device 702 may also send (in a same communication with the indication, or in a separate communication) a current geographic location of the second peer device 702, which may be obtained using various geolocation mechanism, such as via a Global Positioning System (GPS) receiver of the second peer device 702, or some other location-determining mechanism available to the second peer device 702.

At block 1108, the second peer device 702 may receive, over a P2P connection with the first peer device, a type of updated radio protocol data 607 that is associated with the current geographic location of the second peer device 702. For example, the first peer device may compare the current geographic location of the second peer device 702 to geographic locations (or areas) associated with the multiple types of updated radio protocol data in its possession to determine which type of radio protocol data is relevant for the second peer device 702. The process 1100 may continue from 1108 by performing the operation(s) at block 908 of the process 900 of FIG. 9, as shown by the off-page reference "B" in FIGS. 9 and 11. In other words, the second peer device 702 may continue determine whether to implement the updated radio protocol data using the example process 900, from block 908 onward.

Figure 12:
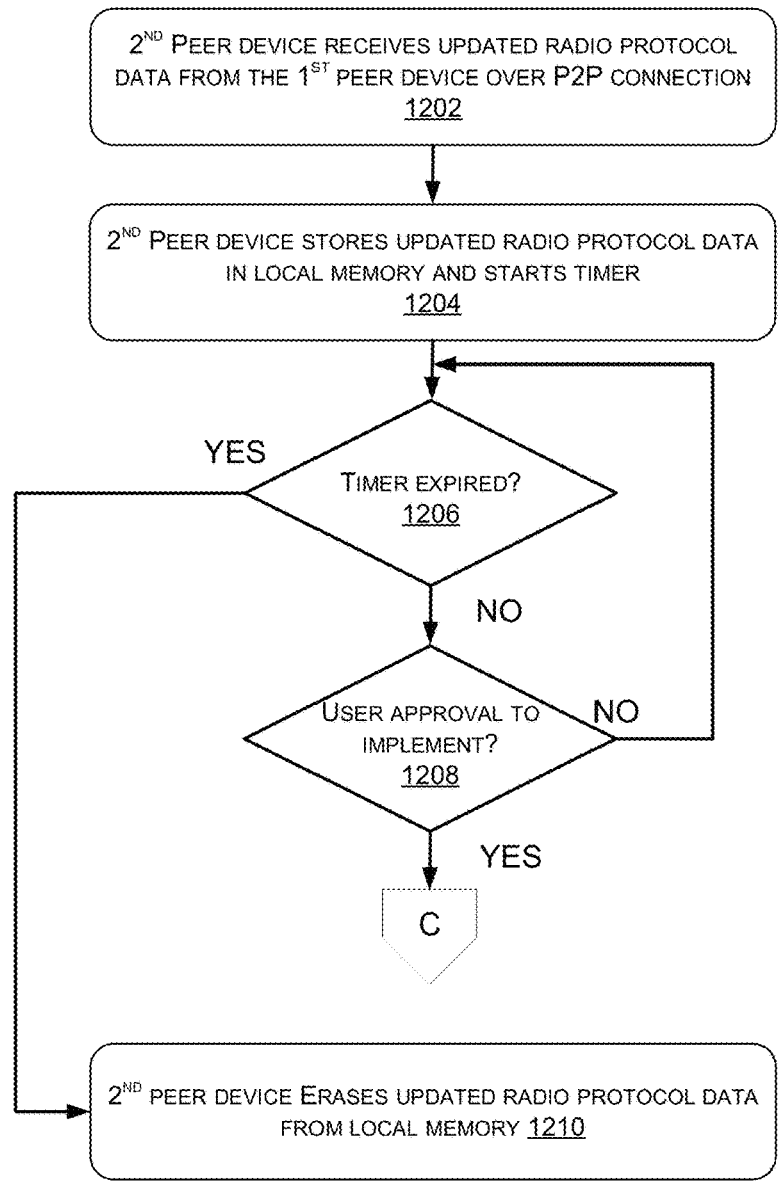
FIG. 12 is a flow chart of an example process to be implemented by a peer device for erasing unused radio protocol data, in accordance with embodiments of the disclosure.

FIG. 12 is a flow chart of an example process 1200 to be implemented by a peer device for erasing unused radio protocol data, in accordance with embodiments of the disclosure.

At block 1202, a second peer device 702 may receive, over a P2P connection with a first peer device, updated radio protocol data 607 from the first peer device.

At block 1204, the second peer device 702 may store the updated radio protocol data 607 in local memory 732 of the second peer device 702 without implementing the updated radio protocol data 607, and the second peer device 702 may start a timer that is to run for a prescribed period of time (e.g., 24 hours, 48 hours, etc.). The timer may be started when the data 607 is received at block 1202, or when the data 607 is stored at block 1204. Because these blocks may be performed relatively quickly (e.g., within a few milliseconds), the difference of when to start the timer may be negligible.

At block 1206, the second peer device 702 determine whether the timer has expired since the timer was started (data 607 received or stored). If the timer has not expired at block 1206, the process 1200 may follow the "no" route from block 1206 to block 1208 where the second peer device 702 may determine whether a user of the second peer device 702 has provided user input approving implementation of the radio protocol corresponding to the received radio protocol data 607 on the second peer device within the prescribed period of time since starting the timer. If no user input approving of the implementation is received at block 1208, the process 1200 may follow the "no" route from block 1208 to block 1206, where the status of the timer is checked again. If the timer expires at block 1206 before user input is received at block 1208, the process 1200 may follow the "yes" route from block 1206 to block 1210 where the second peer device 702 may erase the updated radio protocol data 607 from the local memory 732 of the second peer device 702 without updating a SDR of the second peer device 702. The second peer device 702 erases the data 607 because of an absence of user input approving the implementation of the particular radio protocol within the prescribed period of time.

If, on the other hand, user input approving the implementation of the particular radio protocol is received within the prescribed period of time at block 1208, the process 1200 may follow the "yes" route from block 1208 to block 914 of the process 900 of FIG. 9, as shown by the off-page reference "C" in FIGS. 9 and 12. In other words, once the user approves of implementing the radio protocol data 607 before expiration of the time period, the second peer device 702 may implement the radio protocol data 607 to re-configure the second peer device 702. In some embodiments, the user of the second peer device 702 is not charged for use of the data 607 if the user does not provide user input approving of the implementation of the data 607, which lets the user decide whether he/she wants to re-configure the second peer device 702.

Figure 13:
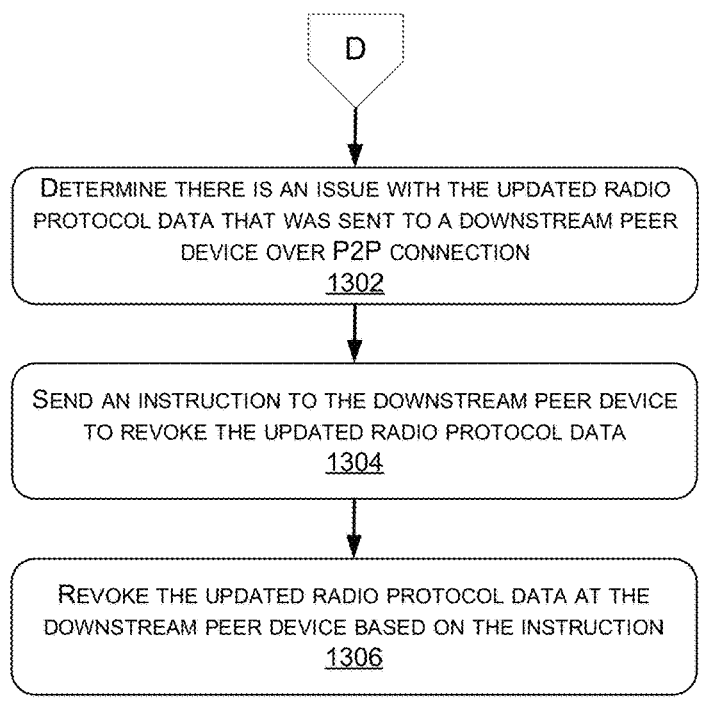
FIG. 13 is a flow chart of an example process for revoking previously-sent radio protocol data, in accordance with embodiments of the disclosure.

FIG. 13 is a flow chart of an example process 1300 for revoking previously-sent radio protocol data, in accordance with embodiments of the disclosure. As shown by the off-page reference "D", the process 1300 may continue from block 816 of the process 800 of FIG. 8, or the process 1300 may continue from block 916 of the process 900 of FIG. 9.

In either case, updated radio protocol data 607 has already been sent to a downstream peer device by the time block 1302 is performed.

At block 1302, a device (e.g., the hub device 602 or another peer device) may determine that there is an issue with the updated radio protocol data 607 it previously sent to a downstream peer device. This determination may be made based on a communication from the remote server(s) of the telecom carrier 608, such as when users report a possible virus associated with the updated radio protocol data. Alternatively, this determination may be made by the device itself after determining (using local security software) that there is an issue (e.g., a virus) associated with the data 607.

At block 1304, the device may send an instruction to the downstream peer device to revoke the updated radio protocol data 607. The instruction to revoke may be an instruction to delete the data 607 and/or write over the data 607. This instruction may also instruct the downstream peer device to revert to an original version of a SDR of the downstream peer device, which the downstream peer device may have saved in a portion of its local memory as a failsafe so that it can revert back to a previous radio protocol.

At block 1306, the downstream peer device may receive the instruction and revoke the updated radio protocol data 607 it previously received from the device. The revocation at block 1306 may include deleting or erasing the updated radio protocol data 607 from local memory of the downstream peer device, writing over the updated radio protocol data 607 with original radio protocol data saved in local memory of the downstream peer device or with new radio protocol data received from the device along with the instruction at block 1304, and/or reverting to using an original radio protocol that was used on the downstream peer device before it received the updated radio protocol data 607.

Figure 14:
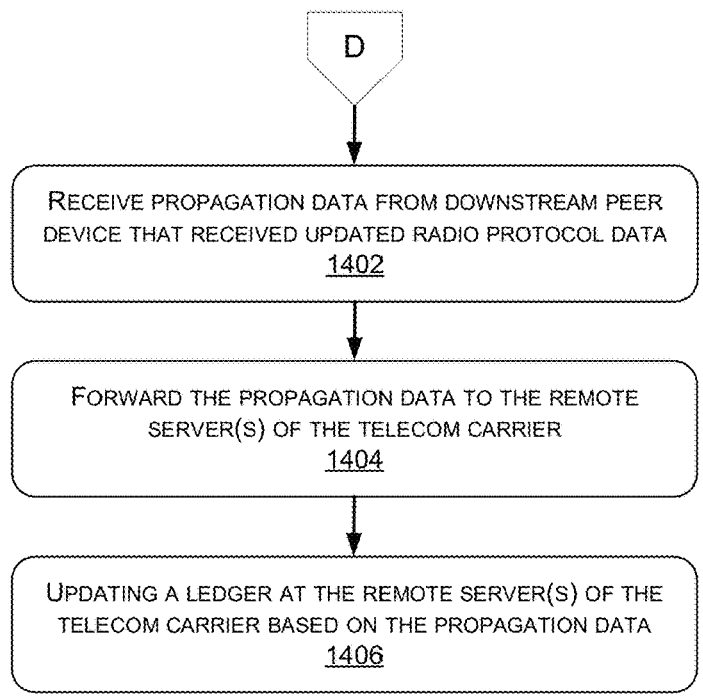
FIG. 14 is a flow chart of an example process for maintaining a ledger with information about the propagation of radio protocol data through a peer-to-peer network, in accordance with embodiments of the disclosure.

FIG. 14 is a flow chart of an example process 1400 for maintaining a ledger with information about the propagation of radio protocol data through a peer-to-peer network, in accordance with embodiments of the disclosure. As shown by the off-page reference "D", the process 1300 may continue from block 816 of the process 800 of FIG. 8, or the process 1300 may continue from block 916 of the process 900 of FIG. 9. In either case, updated radio protocol data 607 has already been sent to a downstream peer device by the time block 1402 is performed.

At block 1402, a device (e.g., the hub device 602 or another peer device) may receive propagation data from a downstream peer device that previously received the updated radio protocol data 607 from the device over a P2P connection. This is also illustrated in FIG. 6, where the IoT device 604(1), after having received the updated radio protocol data 607 from the IoT device 604(2) may send propagation data 626 to the IoT device 604(2). The IoT device 604(2), in turn, may send propagation data 626 to the hub device 602 after receiving the updated radio protocol data 607 from the hub device 602. The propagation data 626 sent by the IoT device 604(2) may be a roll-up of the propagation data 626 it received from the IoT device 604(1) and its own propagation data 626. In this manner, the hub device 602 can collect propagation data 626 from all downstream peer devices in a chain of distribution. An example technology that can be used for this purpose is block chain. Using block chain, a growing list of records, called blocks, can be collected based on the propagation data 626 that is passed back to an upstream device from any downstream peer device, and each block in the list can contain a hash pointer as a link to a previous block, a timestamp and transaction data.

In some embodiments, the propagation data 626 received by the device at block 1402 can include a list of peer devices, including at least one immediate (neighboring) downstream peer device that received the updated radio protocol data 607 from the device prior to block 1402, each peer device in the list having received the updated radio protocol data 607 from an immediate (neighboring) upstream device. The propagation data 626 may also include timestamp data that indicates times when the updated radio protocol data 607 was received at each peer device in the list, geographic locations where each peer device in the list was located when the updated radio protocol data was received at each peer device, and/or information about whether each peer device in the list (i) implemented the updated radio protocol data 607 it received, or, instead (ii) forwarded the updated radio protocol data 607 to another, downstream peer device without implementing the updated radio protocol data.

It is to be appreciated that each peer device that receives updated radio protocol data 607 over a P2P connection may keep track of the upstream device that it received the data 607 from in order to address that upstream device when sending the propagation data 626 back upstream in the P2P distribution chain. It is also to be appreciated that the transmission of propagation data 626 may occur immediately (e.g., within a relatively short period of time, such as a few seconds, a few milliseconds, or the like) after the device transmitting the propagation data 626 received the updated radio protocol data 607 from an immediate upstream device. This is because mobile devices may move after updated radio protocol data 607 is transmitted over a P2P connection, making it difficult, or impossible in some cases, to send the propagation data 626 back upstream if the pair of devices have since moved out of range to transfer the propagation data 626. In this situation, a peer device 626 that is trying to send propagation data 626 to an upstream device, but is failing to do so successfully, may, as a backup measure, try to connect to the remote server(s) of the telecom carrier 608 in order to upload the propagation data 626 directly to the remote server(s).

At block 1404, the device that received the propagation data 626 at block 1402 may forward the propagation data to the remote server(s) of the telecom carrier 608. If the device performing the operation at block 1404 is the hub device 602, the forwarding may be a direct transfer of propagation data 626 over the telecommunications network 606 to the remote server(s). If the device performing the operation at block 1404 is a peer device that is different from the hub device 602, the propagation data 626 may be forwarded to the remote server(s) indirectly, via one or more intermediate devices, including the hub device 602.

At block 1406, the remote server(s) of the telecom carrier 608 receives the propagation data 626 and updates a ledger 628 (as shown in FIG. 6) at the telecom carrier's 608 system based on the received propagation data 626. The telecom carrier 608 can then utilize the information in the ledger 628 for various purposes. In an example, the telecom carrier 606 can determine how a particular update propagated through a network of peer devices (e.g., what hops were made between hub devices 602 and peer devices), and, using the timestamp data, the carrier 608 can determine how fast an update propagated through the P2P network. This may be used to determine if different ways of propagating updates are more effective (e.g., pushing an update at a certain time of day, such as during a commute time when many people are out and about with their user devices), or pushing the update to particular hub devices 602 located at particular geographic locations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of propagating updated radio protocol data in a peer-to-peer distribution scheme so that peer devices that are currently incompatible with a particular radio protocol can be dynamically reconfigured to communicate with other devices using the particular radio protocol, the method comprising:
   receiving, at a second peer device, a broadcast from a first peer device collocated in a local environment with the second peer device, the broadcast including an indication that the first peer device is in possession of the updated radio protocol data corresponding to the particular radio protocol;
   determining that the second peer device is incompatible with the particular radio protocol;
   in response to determining that the second peer device is incompatible with the particular radio protocol:
      sending, from the second peer device, an indication to the first peer device that the second peer device is ready to receive the updated radio protocol data from the first peer device;
      receiving, at the second peer device over a peer-to-peer connection with the first peer device, the updated radio protocol data from the first peer device; and
      updating, on the second peer device based at least in part on the updated radio protocol data, a software defined radio (SDR) of the second peer device, wherein the SDR of the second peer device, after the updating, is operable to establish a connection, and communicate, with the other devices using the particular radio protocol.

2. The method of claim 1, wherein the updating of the SDR of the second peer device includes reconfiguring one or more components of an existing SDR to convert the existing SDR into a reconfigured SDR, the method further comprising:
   maintaining an original version of the existing SDR in local memory of the second peer device after the updating of the SDR of the second peer device.

3. The method of claim 1, wherein the second peer device is a user device, the method further comprising:
   receiving, at the second peer device, prior to the receiving of the broadcast from the first peer device, user input from a user of the second peer device requesting to opt into the peer-to-peer distribution scheme for receiving and forwarding the updated radio protocol data.

4. The method of claim 3, further comprising, prior to the receiving of the broadcast from the first peer device:
   outputting a user interface requesting the user to define:
      a first group of entities from which the user is willing to receive the updated radio protocol data at the second peer device; and
      a second group of entities to which the user is willing to forward the updated radio protocol data from the second peer device; and storing group data in local memory of the second peer device, the group data specifying the first group and the second group.

5. The method of claim 4, further comprising:
determining that the first peer device is within the first group specified in the group data maintained in the local memory of the second peer device,
wherein the sending of the indication to the first peer device that the second peer device is ready to receive the updated radio protocol data from the first peer device is conditioned on the first peer device being within the first group specified in the group data maintained in the local memory of the second peer device.

6. The method of claim of claim 3, further comprising:
receiving, at the second peer device, a user preference indicating whether the user prefers to receive the updated radio protocol data at the second peer device from another peer device via the peer-to-peer distribution scheme or directly from a remote update server.

7. The method of claim 1, further comprising:
wherein the determining that the second peer device is incompatible with the particular radio protocol is prior to the receiving of the updated radio protocol data, and
wherein the sending of the indication to the first peer device that the second peer device is ready to receive the updated radio protocol data from the first peer device is conditioned on the second peer device being incompatible with the particular radio protocol prior to the receiving of the updated radio protocol data.

8. The method of claim 1, further comprising:
determining that the updated radio protocol data is signed by a trusted entity,
wherein the updating of the SDR is conditioned on the updated radio protocol being signed by the trusted entity.

9. The method of claim 1, further comprising:
broadcasting, by the second peer device within the local environment, or a different local environment after movement of the second peer device, an indication that the second peer device is in possession of the updated radio protocol data;
receiving, at the second peer device from a third peer device that is located in the local environment, or the different local environment, an indication that the third peer device is ready to receive the updated radio protocol data from the second peer device; and
sending, by the second peer device over a peer-to-peer connection with the third peer device, the updated radio protocol data to the third peer device.

10. The method of claim 9, further comprising:
determining, by the second peer device, that there is an issue with the updated radio protocol data sent to the third peer device;
sending, from the second peer device to the third peer device, an instruction to revoke the updated radio protocol data.

11. The method of claim 1, wherein determining that the second peer device is incompatible with the particular radio protocol comprises at least one of comparing a make and model of the second peer device to a list of make and model pairs or comparing an existing radio protocol to a radio protocol associated with the updated radio protocol data, the second peer device being compatible with the existing radio protocol.

12. The method of claim 1, further comprising:
determining, by the second peer device, that the second peer device is unable to establish a connection with a remote server; and
broadcasting, from the second peer device, an indication that the second peer device is incompatible with the particular radio protocol.

13. The method of claim 1, further comprising:
receiving, at the second peer device, a user input approving implementation of the of the particular radio protocol before a timer expires,
wherein receiving, at the second peer device over a peer-to-peer connection with the first peer device, the updated radio protocol data from the first peer device comprises starting the timer.

14. The method of claim 1, further comprising:
transmitting, from the second peer device, propagation data that includes:
a list of peer devices, including the second peer device, that received the updated radio protocol data; and
timestamp data indicating times when the updated radio protocol data was received at each peer device in the list.

15. The method of claim 14, wherein the propagation data further includes at least one of:
geographic locations where each peer device in the list was located when the updated radio protocol data was received at each peer device; or
information about whether each peer device in the list (i) implemented the updated radio protocol data or (ii) forwarded the updated radio protocol data to another peer device without implementing the updated radio protocol data.

16. The method of claim 1, wherein the indication included in the broadcast indicates that the first peer device is in possession of multiple types of updated radio protocol data including the updated radio protocol data and at least one other type of radio protocol data, the method further comprising:
sending, from the second peer device, a current geographic location of the second peer device to the first peer device,
wherein the updated radio protocol data received at the second peer device from the first peer device over the peer-to-peer connection is associated with the current geographic location of the second peer device, and wherein the at least one other type of radio protocol data is not associated with the current geographic location of the second peer device.

17. A second peer device comprising:
a processor; and
a memory storing computer-executable instructions that, when executed by the processor, cause the second peer device to:
receive a broadcast from a first peer device collocated in a local environment with the second peer device, the broadcast including an indication that the first peer device is in possession of updated radio protocol data corresponding to a particular radio protocol;
determine that the second peer device is incompatible with the particular radio protocol;
in response to determining that the second peer device is incompatible with the particular radio protocol:
send an indication to the first peer device that the second peer device is ready to receive the updated radio protocol data from the first peer device;

receive, over a peer-to-peer connection with the first peer device, the updated radio protocol data from the first peer device; and update, based at least in part on the updated radio protocol data, a software defined radio (SDR) of the second peer device to be operable to establish a connection, and communicate, with other devices using the particular radio protocol; or forward the updated radio protocol data to a third peer device that is collocated with the second peer device in the local environment, or a different local environment after movement of the second peer device.

18. The second peer device of claim 17, wherein the second peer device is a user device, and wherein the computer-executable instructions, when executed by the processor, further cause the second peer device to:

determine that a user of the second peer device has not provided user input approving implementation of the particular radio protocol on the second peer device within a period of time since the updated radio protocol data was received at the second peer device over the peer-to-peer connection from the first peer device; and erase the updated radio protocol data from the memory of the second peer device without updating the SDR of the second peer device based at least in part on an absence of the user input approving the implementation of the particular radio protocol within the period of time.

19. The second peer device of claim 17, wherein the second peer device is a user device, and wherein the computer-executable instructions, when executed by the processor, further cause the second peer device to:

receive, at the second peer device, prior to receiving the broadcast from the first peer device, user input from a user of the second peer device requesting to opt into a peer-to-peer distribution scheme for receiving and forwarding the updated radio protocol data;

output a user interface requesting the user to define:
  a first group of entities from which the user is willing to receive the updated radio protocol data at the second peer device; and
  a second group of entities to which the user is willing to forward the updated radio protocol data from the second peer device; and store group data in the memory of the second peer device, the group data specifying the first group and the second group.

20. The second peer device of claim 19, wherein:

the computer-executable instructions, when executed by the processor, further cause the second peer device to determine that the first peer device is within the first group specified in the group data stored in the memory of the second peer device; and sending the indication to the first peer device that the second peer device is ready to receive the updated radio protocol data from the first peer device is conditioned on the first peer device being within the first group specified in the group data stored in the memory of the second peer device.

* * * * *